United States Patent [19]

Murphy

[11] Patent Number: 5,700,685

[45] Date of Patent: Dec. 23, 1997

[54] SYSTEM TO REDUCE SEDIMENT TOXICITY

[75] Inventor: Thomas Murphy, Grimsby, Canada

[73] Assignee: Her Majesty the Queen in right of Canada, as represented by the Minister of the Environment, Hull, Canada

[21] Appl. No.: 562,856

[22] Filed: Nov. 27, 1995

Related U.S. Application Data

[63] Continuation-in-part of Ser. No. 419,290, Apr. 10, 1995, Pat. No. 5,481,815, which is a continuation-in-part of Ser. No. 84,620, Jul. 1, 1993, abandoned.

[51] Int. Cl.⁶ .................. C12N 1/00; C12N 1/38; C05C 5/04
[52] U.S. Cl. .............. 435/262.5; 435/292; 210/71; 210/610; 210/751; 210/764; 210/916
[58] Field of Search ............... 435/262.5, 292; 210/751, 764, 916, 71, 610

[56] References Cited

U.S. PATENT DOCUMENTS

| | | | |
|---|---|---|---|
| 1,204,772 | 11/1916 | Hornecker | 111/120 |
| 1,348,038 | 7/1920 | Neumeyer | 239/172 |
| 3,357,642 | 12/1967 | Horton | 239/159 |
| 3,402,487 | 9/1968 | Vaughan et al. | |
| 4,268,398 | 5/1981 | Shuck et al. | 210/758 |
| 4,426,807 | 1/1984 | Maddock | 239/172 |
| 4,781,842 | 11/1988 | Nicholson | 210/751 |
| 4,877,524 | 10/1989 | Eberhardt | 210/242.1 |
| 4,911,843 | 3/1990 | Hunniford et al. | 210/610 |
| 5,008,020 | 4/1991 | Surash et al. | 210/751 |
| 5,039,427 | 8/1991 | Conover | 210/702 |
| 5,055,204 | 10/1991 | Bogart | 210/758 |
| 5,150,988 | 9/1992 | Powell et al. | 405/258 |
| 5,173,413 | 12/1992 | Coughlin et al. | 435/262.5 |
| 5,200,092 | 4/1993 | Richards et al. | 210/758 |
| 5,501,973 | 3/1996 | Mayfield | 435/262.5 |

FOREIGN PATENT DOCUMENTS

| | | |
|---|---|---|
| 2010741 | 8/1981 | Canada. |
| 2016310 | 7/1990 | Canada. |
| 2007455 | 11/1990 | Canada. |
| 0 257 317 | 3/1988 | European Pat. Off.. |
| 0 475 227 | 3/1992 | European Pat. Off.. |
| 3621313 | 1/1988 | Germany. |
| 4117513 | 12/1992 | Germany. |
| 2006900 | 1/1990 | Japan. |

OTHER PUBLICATIONS

Cooke et al., "Sediment Oxidation" *Lake and Restoration*, 1986, pp. 133–138.

Müncnerovà et al., "Fungal Metabolism and Detoxification of Polycyclic Aromatic Hydrocarbons: A Review", *Bioresource Technology*, 48, 1994, pp. 97–106.

*Primary Examiner*—Helen Pratt
*Attorney, Agent, or Firm*—Paul Sharpe; McFadden, Fincham

[57] ABSTRACT

A method and apparatus for the treatment of sediment. The apparatus provides a plurality of injection sites for injecting a biochemical oxidant into the sediment. The oxidant is useful for oxidizing a bacterial growth inhibitor to a noninhibiting form thus permitting bacterial growth and thus greater numbers for sediment detoxification.

22 Claims, 26 Drawing Sheets

SYSTEM TO REDUCE SEDIMENT TOXICITY

This application is a continuation-in-part application of U.S. Ser. No. 08/419,290 filed Apr. 10, 1995 now U.S. Pat. No. 5,481,815, which in turn, is a continuation-in-part of U.S. Ser. No. 08/084,620 filed Jul. 1, 1993 now abandoned.

FIELD OF THE INVENTION

The present invention relates to a method and apparatus for the treatment of sediment and more particularly to a chemical treatment method and apparatus to effect such treatment.

BACKGROUND OF THE INVENTION

Generally speaking, most of the biodegradation studies and treatments are done in reactors (Jafvert and Rogers 1991). The largest reactor is a Dutch system where a mobile aerator moves along the treatment pond to maintain oxygenated conditions (Van Veen and Annokkee 1991). Other large treatments include landfarming (Van Dillen 1991) and the excavation and construction of a hill of contaminated soil with drainage tiles, nutrient dosing and sprinkler systems (Litchfield et al. 1992). These systems all require that the sediment be dredged and processed in sites which can involve the potential problems of security, cost, and public acceptance.

Some soil reclamation using biodegradation has occurred without excavation. The success of these treatments has varied greatly (Lee et al. 1988). Some contaminants cannot be readily biodegraded. Some treatments may not have provided the right environmental conditions for the microbes to completely biodegrade the organic wastes. Most of the failed bioremediation treatments in groundwater are related to either poor access to the wastes or to the blockage of the aquifer by the enhanced growth of microbes. The latter two problems do not apply to lake sediment on a macroscale; however, all sites can contain some polynuclear aromatic hydrocarbons (PAHs) locked in microsites which are therefore not biodegradable (Van Dillen 1991). Presumably these refractory PAHs would not be toxic. In similar studies it was found that coal dust contains PAHs but relative to coal tar and creosote, it is biologically inert (Alden and Butt 1987).

Bioremediation of groundwater and soils is a growing industry. As long as the treatment is preceded by an analysis of the treatability and toxicity of the site, it is a promising remedial option. Some toxins cannot be treated by biodegradation, but the cost of assessment is justifiable in that a detailed preassessment is substantially less expensive than excavation and chemical or physical treatment.

Bubbling the water column with oxygen has been proposed as a method of oxygenating the sediment (Murphy 1990). Some lake aeration treatments in Germany successfully oxygenated sediments but treatment with pure oxygen of some lakes in Switzerland did not oxygenate sediments (Gachter 1987). The engineering techniques are not completely developed, the treatment time may be long, and recovery difficult to predict accurately.

Further prior methods for treating sediment of sludge include the method of decontaminating wastewater sludge taught by Nicholson in U.S. Pat. No. 4,781,842. Reference is made to the use of lime, cement kiln dust and lime kiln dust for treating biological sludge. The goal of the treatment is to fertilize agricultural land. The reference does not address the problem of treating sludge associated with a water body for the purpose of enhancing natural microbiological degradation.

U.S. Pat. No. 5,008,020, discloses the use of a metal carbonate and a metal bicarbonate for solidifying waste material into a granular particulate form. The patentees do not discuss the merits of oxidation biodegradation inhibitors in order to effect more efficient biodegradation.

Conover, in U.S. Pat. No. 5,039,427, teaches a method for removing suspended solids and to precipitate and inactivate phosphorus in lake water by adding aluminum hydroxide sulphate. The reference does not discuss oxidation of sulphide to sulphate to reduce inhibition of natural microbial biodegradation.

U.S. Pat. No. 4,877,524, teaches an apparatus for treating bodies of water for correcting chemical, biological or other imbalances. The reference primarily relates to dispensing a treatment agent within a water body, the dispensing rate being proportional to the boat speed. Both aluminum sulphate and sodium aluminate are taught as treatment material among others. There is no provision in the apparatus for injecting or otherwise contacting the sediment with biochemical oxidant and accordingly, no contemplation for enhancing the natural microbial degradation of the sediment and more particularly the toxins of the sediment.

A further apparatus which is known in the art and which is irected to an apparatus for spraying plants is taught in U.S. Pat. No. 1,348,038, issued Jul. 27, 1920 to Neumeyer. When the disclosure of the Neumeyer reference is fully considered, it is clear that the apparatus in no way was intended for use within a thick and often viscous material such as sediment. Neumeyer's arrangement provides branched pipes which are arcuated shaped and include a nozzle, however, it is clear that they are connected to a main branch pipe by a fitting. Further, the terminal end of the branch pipe is connected to a fitting and subsequently to a main support beam. According to the Neumeyer apparatus, it would appear that the arcuate pipes are fixedly secured to the overall apparatus at two distinct points and, accordingly, it would appear that flexibility such as would be required when the apparatus encountered branches, trunks of trees, thick sediment rocks etc., would not be possible.

The Neumeyer arrangement further provides shares or lifting devices which travel in valleys between the crests of soil. Accordingly, it is clear that the apparatus is adapted for use on a surface which has a preformed trough within which the shares or lifting devices can travel. The shares are designed to travel on the ground and maintain the points of the shares either on or slightly above the surface of the ground and in position to engage under fallen or trampled portion of vines. Furtherstill, the Neumeyer disclosure indicates that lifting members are designed so that they do not dig into the ground but will underride vines and lift them to an appropriate height.

As a further limitation in the Neumeyer reference, the system is designed such that the fluid transportation members are the same members which would experience the force realized when debris, thick sludge or sediment etc. is encountered. It would be more desirable to have a separate support system for digging into the soil, which support system would support a separate means of transmitting a treatment fluid into the sediment.

Shuck et al. in U.S. Pat. No. 4,268,398, teach a method for rendering a sludge deposit in a waste water treatment facility into a pumpable mixture for relocation. This reference does not discuss an in-situ procedure for natural biodegradation of the sludge.

Further generally related references include U.S. Pat. No. 5,055,204 and Canadian Patent Application Nos. 2,007,455 and 2,016,310.

In view of the prior art, there exists a need for a sludge treatment process capable of being performed in-situ without stirring up the sediment into the water column and which permits a relatively large area to be treated quickly.

SUMMARY OF THE INVENTION

One object of the present invention is to provide a method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegration, wherein the method comprises the steps of:

- providing a biochemical oxidant selected from the group comprising ferric chloride and calcium nitrate for detoxifying a microbial toxin produced during microbial biodegradation of the polynuclear aromatic hydrocarbons and petroleum hydrocarbons without inactivating the microbes;
- contacting the sediment with the oxidant to detoxify the toxin; and
- effecting enhanced microbial biodegradation of the polynuclear aromatic hydrocarbons and petroleum hydrocarbons.

A further object of the present invention is to provide a method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegration, wherein the method comprises the steps of:

- providing a biochemical oxidant selected from the group comprising ferric chloride and calcium nitrate for detoxifying a microbial toxin produced during microbial biodegradation of the polynuclear aromatic hydrocarbons and petroleum hydrocarbons without inactivating the microbes;
- providing a nutrifying organic amendment for nutrifying microbes;
- injecting the sediment with the amendment and oxidant to detoxify the toxin with minimal disruption of the sediment while nutrifying the microbes; and
- effecting enhanced microbial biodegradation of the polynuclear aromatic hydrocarbons and petroleum hydrocarbons.

By oxidation of the inhibitor, substantial success was realized in the reduction of toxins in the sediment. The successful results were compounded by the fact that the sediment was contacted at a plurality of locations.

The overall process is continuous such that the treatment of the sludge can be effected quickly over a large area.

Nutrients may be added with oxidant concurrently or conterminously. Further, the addition of emulsifier surfactants, or other suitable treatment aids may be employed. Depending on the specific site variables, a pretreatment may be desirable in order to increase the efficiency of the procedure.

A still further object of the present invention according to one embodiment is to provide a method effecting compaction of sediment containing microbes, polynuclear aromatic hydrocarbons and petroleum hydrocarbons and microbial toxin inhibiting biodegration, wherein the method comprises the steps of:

- providing a biochemical oxidant selected from the group comprising ferric chloride and calcium nitrate for detoxifying a microbial toxin produced during microbial degradation of the polynuclear aromatic hydrocarbons and petroleum hydrocarbons without inactivating the microbes;
- providing a fermentation by-product organic amendment;
- injecting the sediment with the oxidant and the by-product organic amendment with minimal disruption of the sediment;
- effecting enhanced microbial degradation of the polynuclear aromatic hydrocarbons and petroleum hydrocarbons; and
- compacting the sediment by evolution of gaseous by-products evolved from contact of the oxidant and amendment with the sediment.

In accordance with another object of the present invention, there is provided a method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegration, wherein the method comprises the steps of:

- providing a biochemical oxidant selected from the group comprising ferric chloride and calcium nitrate for detoxifying a microbial toxin produced during microbial biodegradation of the polynuclear aromatic hydrocarbon and petroleum hydrocarbons without inactivating the microbes;
- providing a fermentation byproduct organic amendment;
- injecting within the sediment at, at least, one level with the oxidant and the organic amendment; and
- effecting enhanced microbial degradation of the polynuclear aromatic hydrocarbons and petroleum hydrocarbons.

Having thus generally described the invention, reference will now be made to the accompanying drawings illustrating preferred embodiments.

DETAILED DESCRIPTION OF THE PREFERRED EMBODIMENTS

Figure 1:
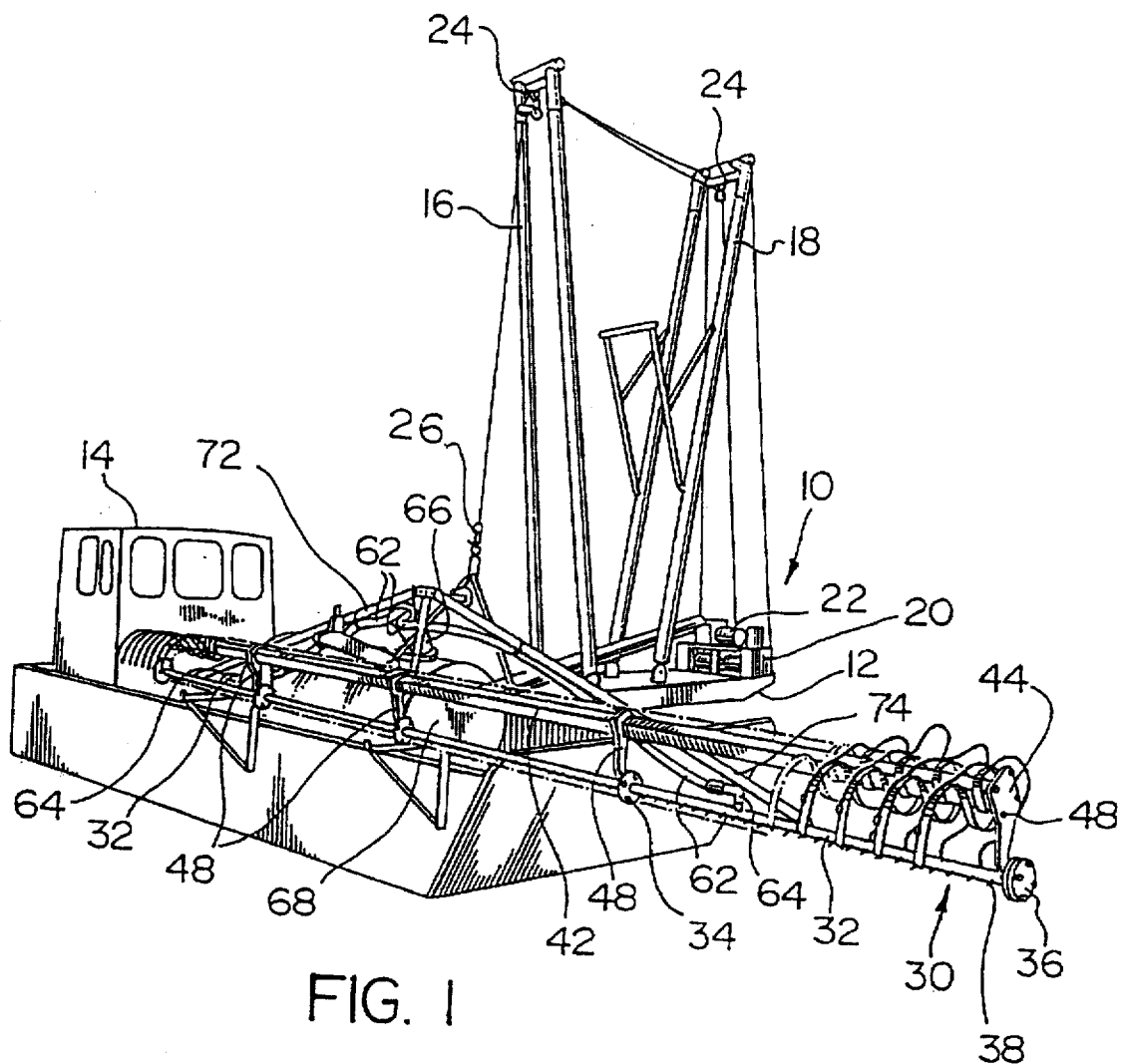
FIG. 1 is a perspective view of one embodiment of the apparatus of the present invention.

Referring initially to the apparatus aspect of the present invention, FIG. 1 illustrates a first embodiment of the present invention, in perspective, as situated on a carrier vessel.

Generally, the apparatus includes movable lifting apparatus 10 having a main support platform 12 rotatably mounted to the carrier vessel 14 for rotation relative thereto, the rotation being achieved by making use of conventional gear arrangements (not shown) or other suitable means. Load bearing masts 16, 18 are connected to the platform 12. A winch cable system 20 includes winches 22 extends over pulleys 24 provided on the load bearing masts 16 and 18. One of the winch cables of the cable system 20 includes a connecting member 26 suitable for connection with the sediment treatment apparatus, generally denoted by numeral 30. A support system is provided for supporting and assisting in the positioning of the treatment apparatus 30, and will be discussed hereinafter.

Figure 2:
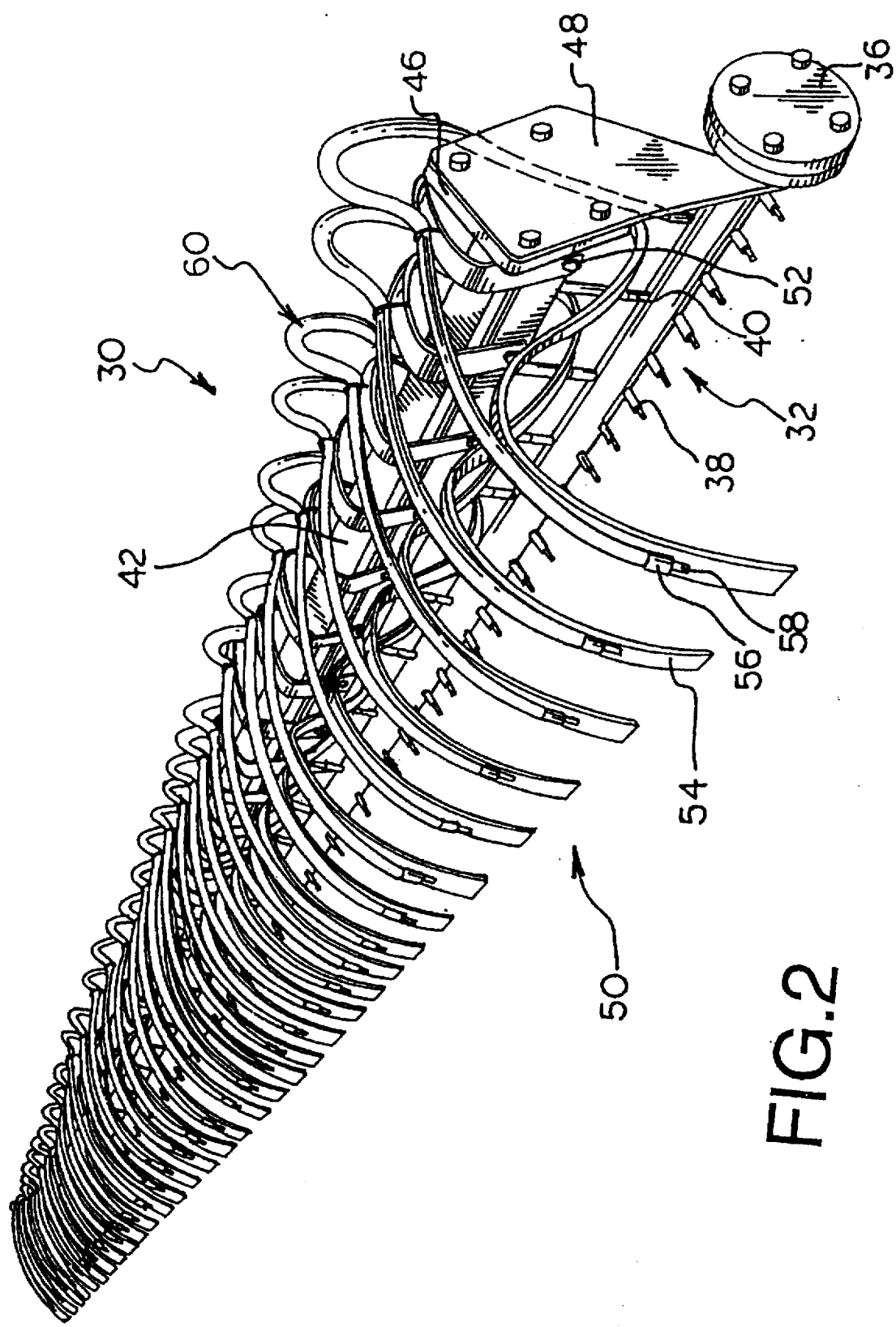
FIG. 2 is an enlarged perspective view of one embodiment of the sediment treatment apparatus.
Figure 3:
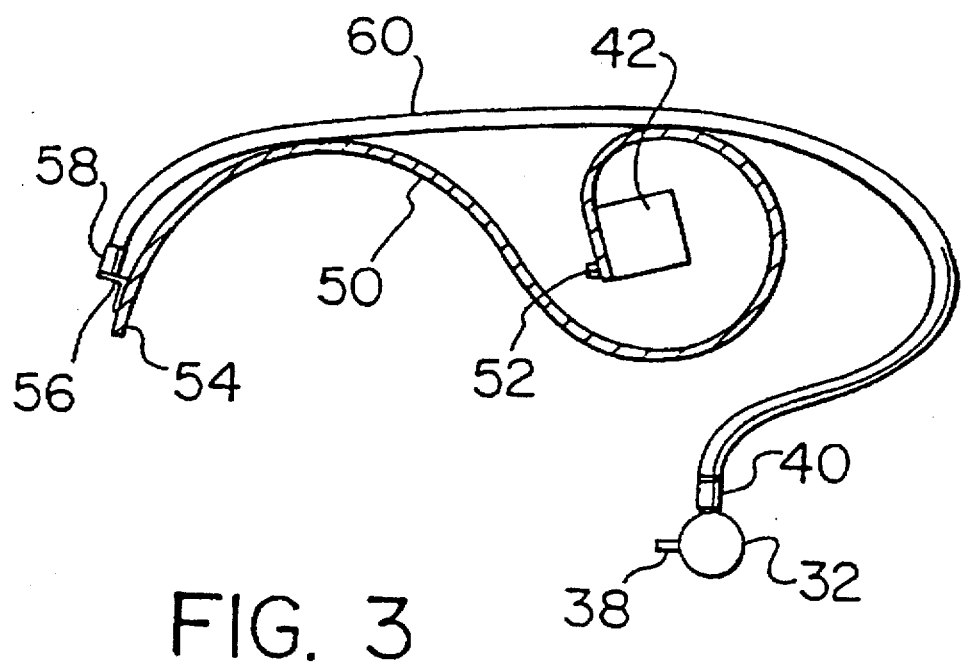
FIG. 3 is a cross-section of FIG. 2.

In one embodiment of the treatment apparatus, best illustrated in FIGS. 2 and 3, an elongate hollow spray bar 32 is included having opposed ends 34 (FIG. 1) and 36. The spray bar 32 includes a plurality of nozzles 38 distributed along the length of bar 32 in a spaced and aligned relation. The nozzles 38 are inclined downwardly relative to a horizontal plane. A second set of nozzles 40 are distributed along the length of spray bar 32 in spaced and aligned relation radially spaced from nozzles 38. Both nozzles 38 and 40 are in fluid communication with spray bar 32.

As is illustrated in the example, the sediment treatment apparatus 30 is composed of a plurality of connected and similar units and accordingly the description will be limited to one such unit.

Spaced above spray bar 32 there is provided a mounting member 42 comprising a metal tube having opposed ends 44 (FIG. 1) and 46. A plurality of such members 42 are connected in end-to-end relation by suitable fasteners as illustrated. Each remote or terminal end as well as the end connection between mounting members 42 includes a spacer member 48, which includes a spacer member 48, which not only spaces the members 42 from the spray bar 32, but additionally serves to impart support to the spray bar 32. Connection of spacer members 48 to member 42 and bar 32 is achieved by suitable fasteners, welding etc.

Each mounting member 42 includes a plurality of arcuate fingers 50 each connected thereto at a single point by bolts 52. The fingers 50 are arranged in longitudinally aligned and spaced relation. Each finger 50 subscribes to a generally sinusoidal configuration and each comprises a rigid metal suitably bent into the indicated shape. The shape of each finger 50 permits resilient flexibility. A free end 54 of each finger 50 is laterally and vertically spaced from the spray bar 32.

Each finger 50 includes, spaced from free end 54 thereof, a nozzle mounting 56 for mounting a nozzle 58. A conduit 60 extends between and connects nozzle 58 with nozzle 40 such that fluid communication is established. In the arrangement, therefor, finger 50 remains separate from each conduit 60 and nozzle 58 thus affording flexibility and penetration into the sediment without any difficulty in dispensing fluid.

Figure 4:
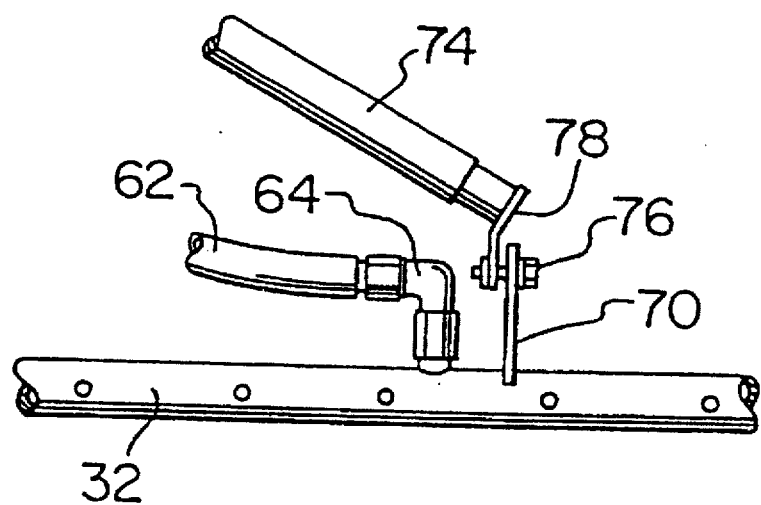
FIG. 4 is an enlarged view of the mounting and fluid distribution for the sediment treatment apparatus.

Treatment fluid is distributed to each spray bar 32 by a distribution conduit 62 connected to each spray bar 32 inwardly of the end thereof by a swivel type connector 64 well known to those skilled. This is generally illustrated in FIG. 4. Each conduit 62 terminates for fluid connection with a main feeder conduit 66 (FIG. 1). Conduit 66 is connected to a fluid treatment supply drum 68 centrally located on the carrier vessel to act as ballast. A pump (not shown) may be positioned intermediate of supply drum 68 and feeder conduit 66 or the fluid may be distributed by negative pressure.

Treatment fluid travelling through each spray bar 32 will be dispensed through nozzles 38 as well as through nozzles 40, all conduits being in fluid communication.

At least the spray bars 32 adjacent the terminal sections thereof further include frame mounts 70 for releasably coupling the treatment apparatus 30 to a frame 72.

FIG. 4 illustrates an enlarged view of the attachment of the end of frame member 74 to spray bar 32 (removed for clarity) as is generally illustrated in FIG. 1. Fastener 76 links a flange 78 on member 74 to frame mount 70. The frame 72 may include a plurality of members 74 which converge, and the member thereof will vary depending on the size of the treatment apparatus. The frame 72 permits easy manipulation of the apparatus from a submerged position to a storage position, the latter position being illustrated. Frame 72 includes a connection site 80 for connection with connecting member 26 on winch cable 20.

Figure 4A:
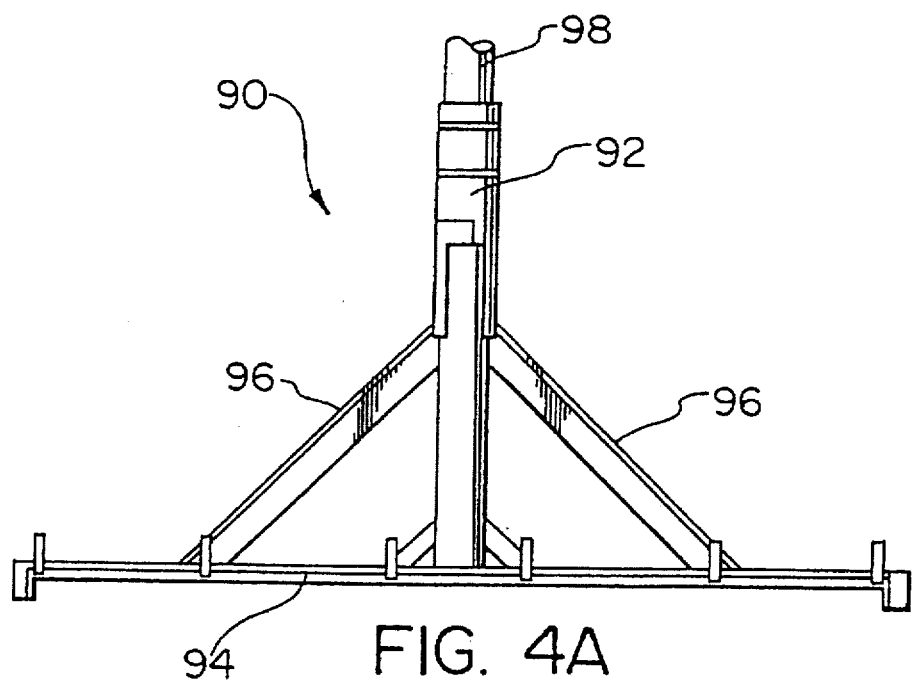
FIG. 4A is a plan view of the sediment treatment apparatus -support.

FIG. 4A illustrates the hangar assembly 90 for positioning the assembly 30 into the sediment at the desired position.

The assembly 90 includes a main load bearing member 92 which terminates at a horizontally disposed bracket 94 for connection with spray bar 32 (not shown). Connection to spray bar 32 may be by any suitable means, e.g. clamps, bolts etc.

Bracket 94 and member 92 are further reinforced by braces 96 extending therebetween.

In order to permit treatment of sediment in a variety of situations where the depth requirement varies, load bearing member 92 may include a plurality of telescopic sections of tube 98 or may be extended by progressive manual connection of further lengths of tubing sections 98.

Load bearing member 92 may be pivotally connected to the load bearing masts 16 and 18, described herein previously, or may be connected directly to platform 12 for easy manipulations of member 92. The specific mounting position of member 92 will depend upon the specific parameters in the treatment area, e.g. water depth etc.

Generally, the tubing sections 98 may comprise rigid aluminum material or other suitable corrosion resistant materials. This material provision is additionally applicable to the overall assembly 90 and frame 72.

Figure 4B:
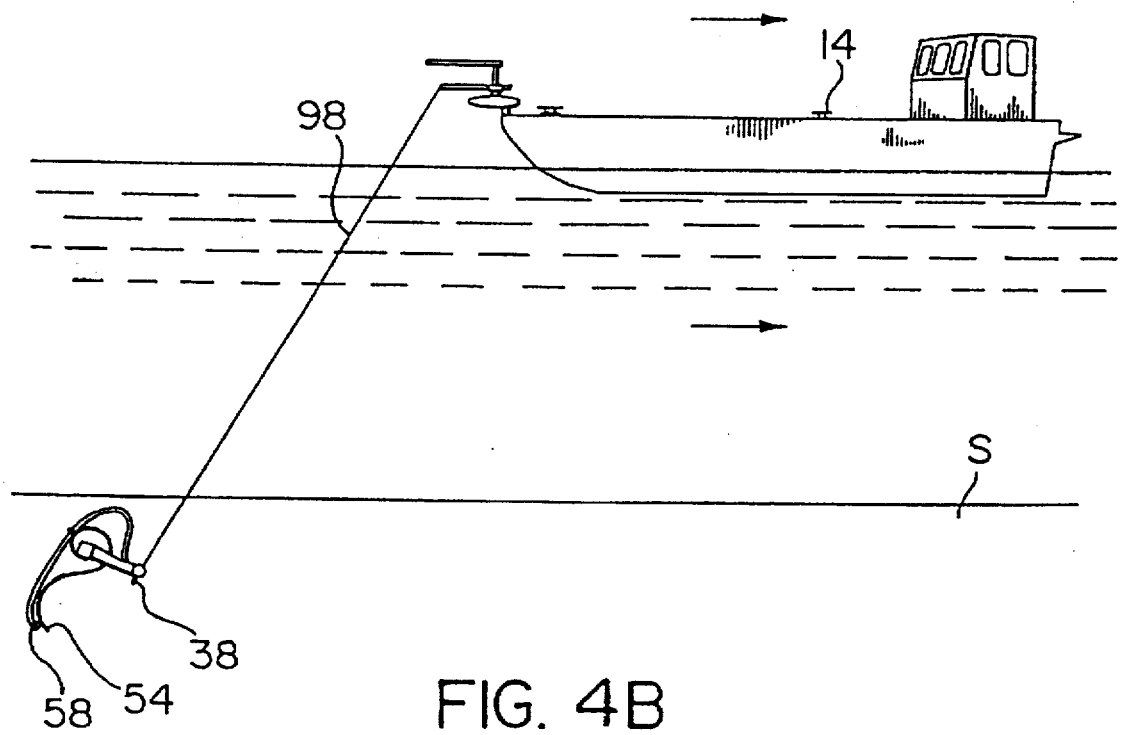
FIG. 4B is a schematic illustration of the apparatus in use.
Figure 5B:
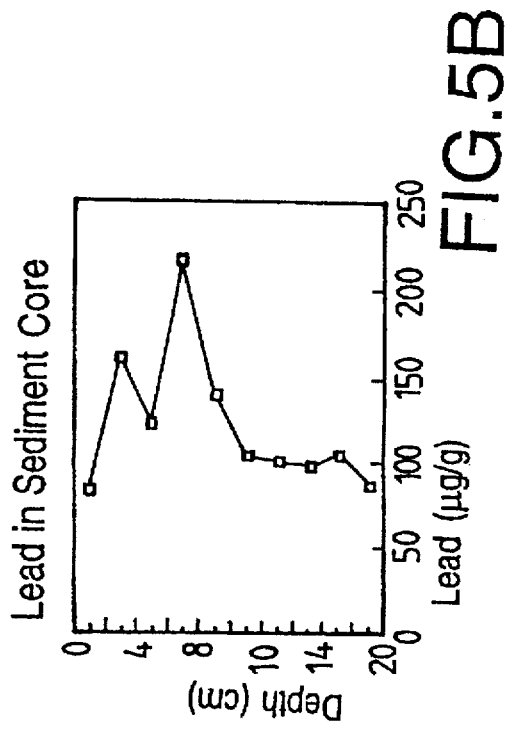
FIGS. 5A through FIG. 5H represent a series of graphs illustrating the concentrations of various contaminants.
Figure 5D:
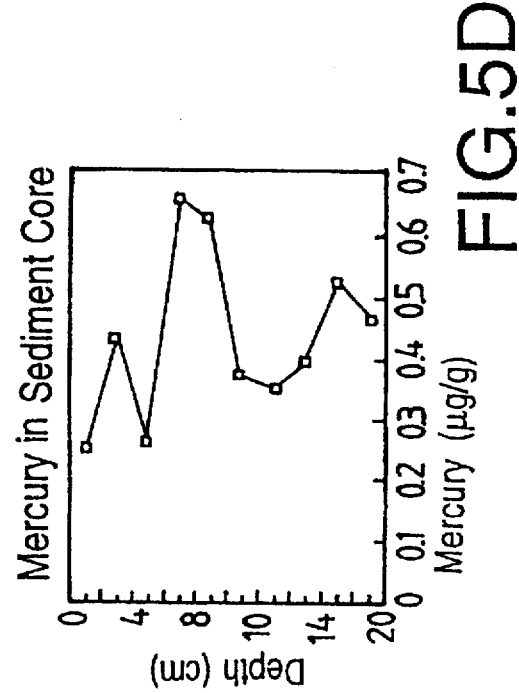
Figure 5A:
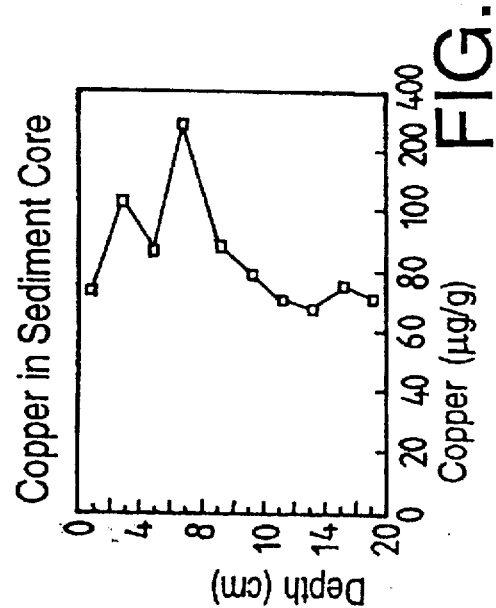
Figure 5C:
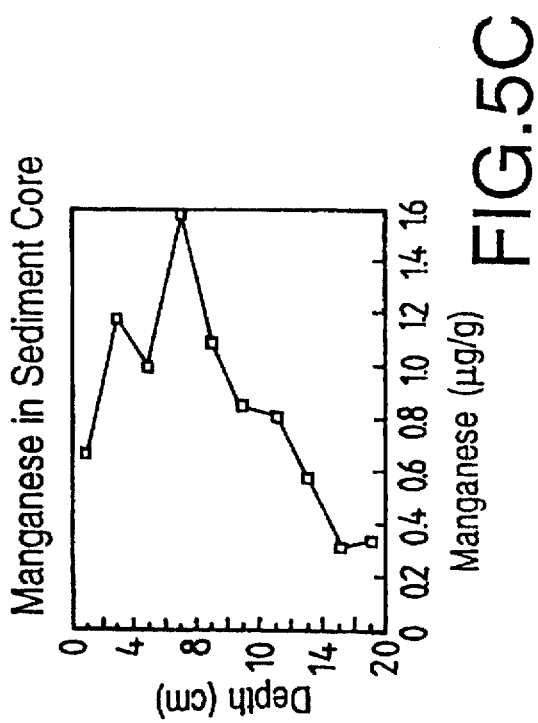
Figure 5F:
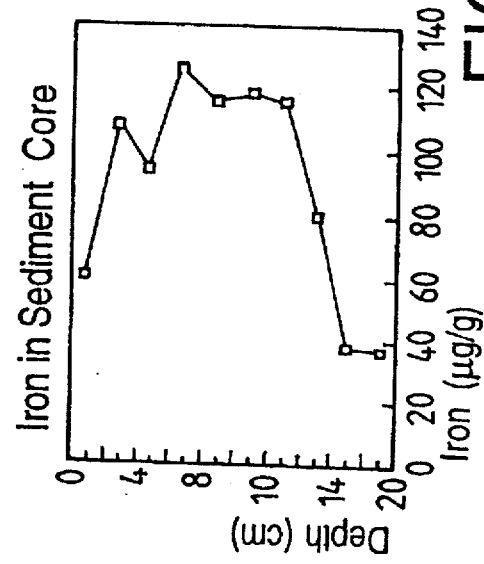
Figure 5H:
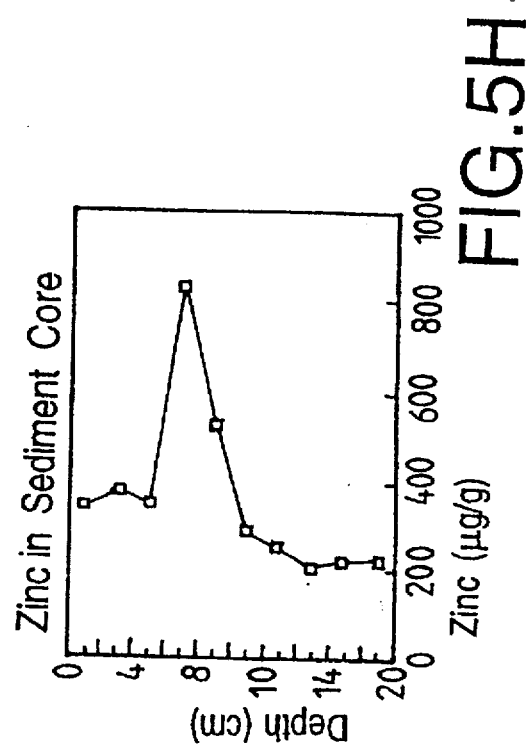
Figure 5E:
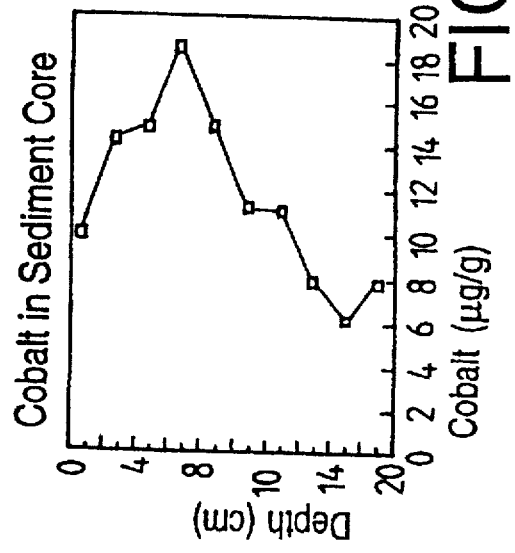
Figure 5G:
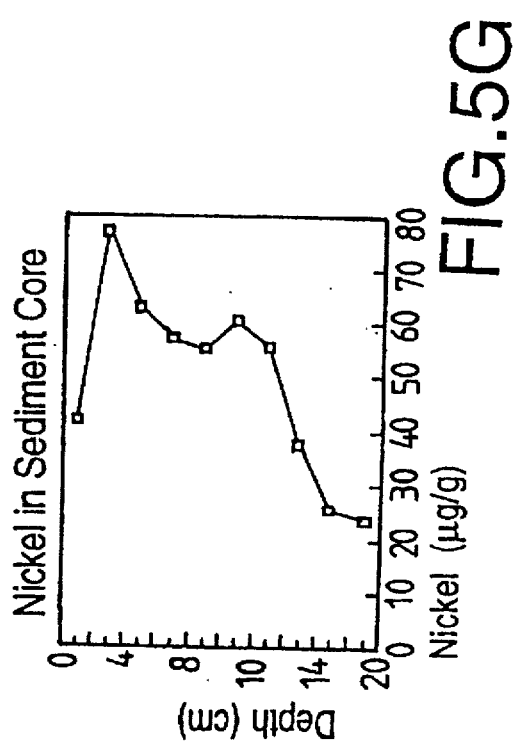

In operation, the treatment apparatus 30 is moved from the storage position shown in FIG. 1 to one possible use position shown in FIG. 4B where the apparatus is submerged below the surface of the water, W, to contact the sediment bed, S. The disposition of the apparatus relative to the sediment S, will vary depending on the condition of the sediment, current conditions, etc.

In the position shown, both the spray bars 32 and the fingers 50 contact the sediment, S, as illustrated. The fingers 50 permit deeper penetration of the nozzles 58 and more specifically the treatment material dispensed therethrough, into contact with the sediment. The nozzles 38 dispense the treatment material in a second position spaced from that of the treatment supplied by nozzles 58. This two-point injection system has a dramatic effect on the sediment detoxification as well be evinced by the data discussed hereinafter.

The treatment apparatus 30 is dragged along the sediment bed as the carrier vessel travels the area to be treated. The arcuate fingers 50 are particularly advantageous for the sediment treatment since the same are resilient and basically unaffected by irregular bed topography, small debris etc. When encountered, the fingers 50 simply flex and return to a normal disposition as the apparatus continues to be advanced along the sediment bed. Recovery of the apparatus from the sediment may be achieved with the winch system described previously.

In preferred form, the overall length of the apparatus is eight (8) meters with the spacing between nozzles 38 and 58 being between 10 and about 20 centimeters. Such spacing permits uniform dispersion within the sediment as opposed to localized areas of treatment.

The rate at which the treatment fluid is injected into the sediment may be timed with the carrier vessel speed i.e. a higher vessel speed will require a higher rate of injection of fluid into the sediment. In an alternate embodiment, the treatment apparatus 30 and the ancillary equipment (winch, a bearing mast etc.) as well as the submerging procedure may be effected by robotics controlled from the shore or at a point distant from the treatment area. This arrangement would reduce the exposure of human workers to the hazardous sediment material and presence around the heavy equipment.

The use of monitoring means e.g. sonar equipment, cameras ultrasonic equipment etc. are all envisioned for use with the apparatus in order to monitor gross sediment topography irregularities or obstacles with which the apparatus 30 cannot contend.

Still further, the connection points between spray bars 32 and between mounting members 42 may be hinged to permit folding of the apparatus 30. In addition, the apparatus may be telescopic.

The examples illustrated teach a two-point treatment injection system and it will be clearly understood that a multiplicity of injection points may be provided simply by, for example, the addition of a further series of fingers having a greater length than the previous series.

Having thus described the apparatus, reference will now be made to the experimental procedures and generated data.

GENERAL

EXAMPLE 1

FERRIC CHLORIDE INJECTION

Earlier laboratory trials with Hamilton Harbour sediments indicated that the addition of iron reduced toxicity to *Photobacterium phosphoreum, Daphnia magna, Salmo gairdneri, Pimephales promelas,* and *Hexagenia limbata*. The seasonal change in sediment toxicity also seemed related to a change in redox, albeit the relationship was not firmly established. Also there was a correlation between the toxicity of the sediments to *Daphnia magna* and the chemical oxygen demand of the sediments. The most appropriate hypothesis to explain these observations is that much of the acute toxicity of the sediments of Hamilton Harbour was caused by reduced chemicals, probably hydrogen sulphide.

Hydrogen sulphide is very toxic. The $LC_{50}$ for various species are: Assellus 1.07 mg/L, Crangonyx 0.84 mg/L, Gammarus 0.059 mg/L, Baetis 0.020 mg/L, Ephemera 0.361 mg/L, and Hexagenia 0.111 mg/L. Chronic analysis indicates that no-effect levels are about 10% of the $LC_{50}$ (Oseid and Smith 1974). Although hydrogen sulphide toxicity is well known, few studies report it in sediments. US EPA (1986) describe hydrogen sulphide as "ephemeral" which indicates that infrequent sampling would not measure hydrogen sulphide. Another limitation is that some professional laboratories use procedures too insensitive to detect toxic concentrations of hydrogen sulphide.

Studies with $^{35}S$-radiolabels have measured the geochemical reactions of sediment sulphur well. For example, Nedwell (1980) determined sulphate reduction in summer is 50–100 times faster than in winter. With intensive monitoring, Ripl (1986) observed large seasonal changes in sulphate; if only a few percent of the seasonal change in sulphate were converted to hydrogen sulphide, the sediments were very toxic. This simplistic assumption may underscore the ecological importance of seasonal changes in hydrogen sulphide toxicity. Ingvorsen and Jorgensen (1982) observed a 20-fold seasonal change in sulphate reduction, but it was matched by seasonal changes in hydrogen sulphide flux from the sediments of $10^3-10^4$ fold! At low rates of hydrogen sulphide production, it was mostly adsorbed to particles, but at high rates of hydrogen sulphide production, the binding sites were saturated and the pulsed release of hydrogen sulphide would have killed many benthic organisms.

Similar sulphur geochemical cycling and sediment toxicity must occur in the hotspots of the Great Lakes but it is not documented. Decades ago, all steel mills discharged large quantities of sulphur from several sources such as sulphur balls from the coking process or spent sulphuric acid in pickling liquor. The areas in Hamilton Harbour and the St. Marys River where these wastes would settle are anoxic and hydrogen sulphide should form.

Inadequate documentation of the sulphur biochemistry could lead to misinterpretation. Hydrogen sulphide has a half life of about 19±19 h (Table 16 in Zehnder and Zinder 1980). Thus it is easy to lose the toxicity by sample handling, such as is commonly done when bubbling invertebrate bioassays with air. The reported absence of Hexagenia from the St. Marys River has been explained by correlation analysis to reflect oil and grease toxicity (St. Marys RAP 1992), but it could easily be caused by hydrogen sulphide toxicity.

Samples were collected on several trips to St. Marys River and several trips to Hamilton Harbour with Ponar (Sault) or Shipek (Hamilton) grab samplers, TechOps corers, and sediment traps. The sediment traps were deployed a meter about the sediments to determine if the sediment injection equipment resuspended sediments. In the St. Marys River, four traps were set at one upstream site and four traps were set at one site downstream of the treatment area.

All St. Marys River samples were stored in a cold room at the Great Lakes Forestry Research Centre, and processed for shipping on ice, i.e., cores were extruded there at 1 cm intervals. The Eh and pH of samples were recorded at the site. All Hamilton Harbour samples were brought back to the institute within hours of sample collection. All samples were chilled and processed quickly, i.e., all bioassays were processed within days of sample collection. Sediment samples were subsampled; half was freeze dried for metal analysis and half was frozen and retained for organic analysis.

The ATP-TOX method of Xu and Dutka (1987) was used on 10% DSMO 10% methanol elutriates. Equal volumes of sediment and DMSO were mixed together and shaken vigorously by hand for 2 minutes. The homogenized slurry was then centrifuged for 20 minutes at 10000 rpm. This system uses the measurement of ATP as indication of microbial growth. If when compared to a control, a sample inhibits ATP production (i.e., growth), a toxic effect is assumed.

Daphnia magna bioassays were done on aqueous elutriates. Within two weeks of collection all samples were extracted with equal volumes of distilled water on an end-over-end shaker for 16 h. After extraction, sediment extracts were centrifuged for 20 min at 1000 g. Elutriates were centrifuged, not filtered. Filtration can remove colloidal material that would not settle from disrupted sediment and that may contain toxic metallic or organic contaminants. Ten Daphnia less than 24 h old were introduced to 25 mL of test medium and placed in a 25° C. incubator for 48 h. A 16 h light and 8 h dark photoperiod was used. Prior to all experiments, pH and dissolved oxygen were measured and if the oxygen concentration was less than 8 mg/L, the sediment extracts were bubbled with purified air for 16 h. If more than 10% of the control Daphnia died within 48 h, the experiment was repeated.

Photobacterium bioassays were run on whole sediments (Brouwer et al. 1990). Dilutions for $LC_{50}$ analysis were done with clean sediments from an organic rich sediment from a marsh near Long Point, Lake Erie.

SEDIMENTS AT THE BELLEVUE PARK SITE ST. MARYS RIVER

Figure 6:
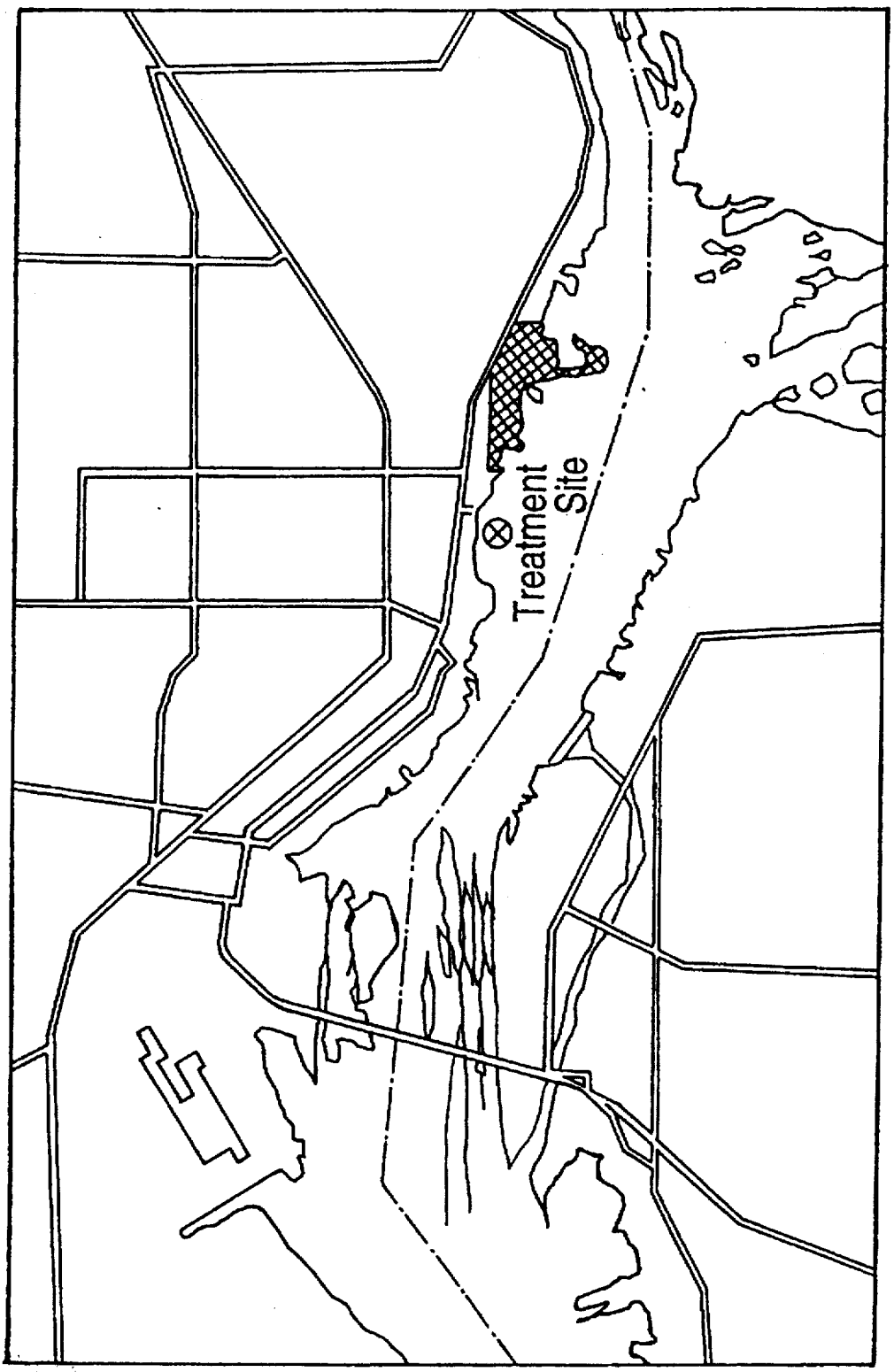
FIG. 6 is a schematic illustration of the test area.
Figure 7A:
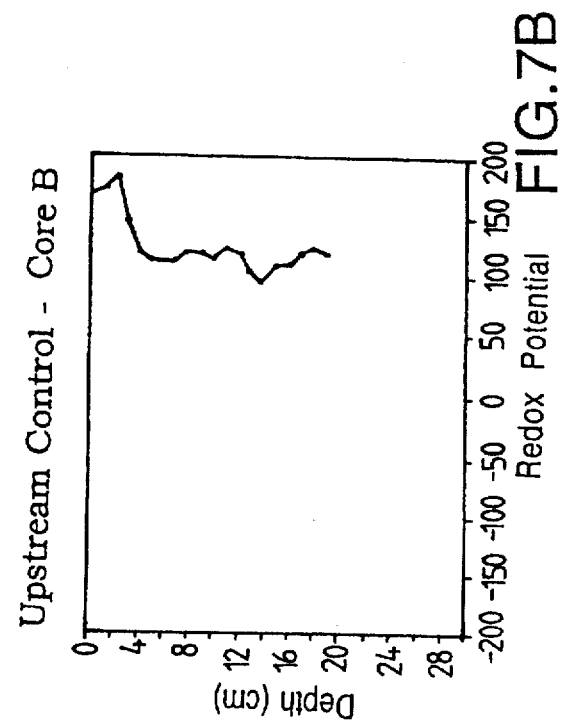
FIGS. 7A through FIG. 7D represent illustrations of the redox potential of St. Marys River sediment cores.
Figure 7B:
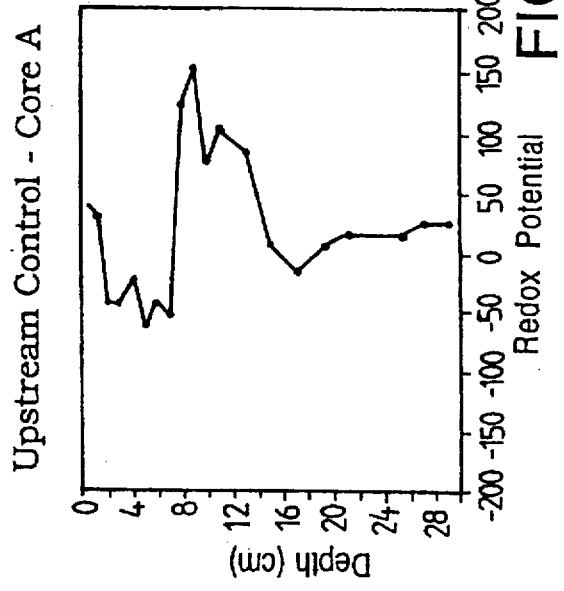
Figure 7C:
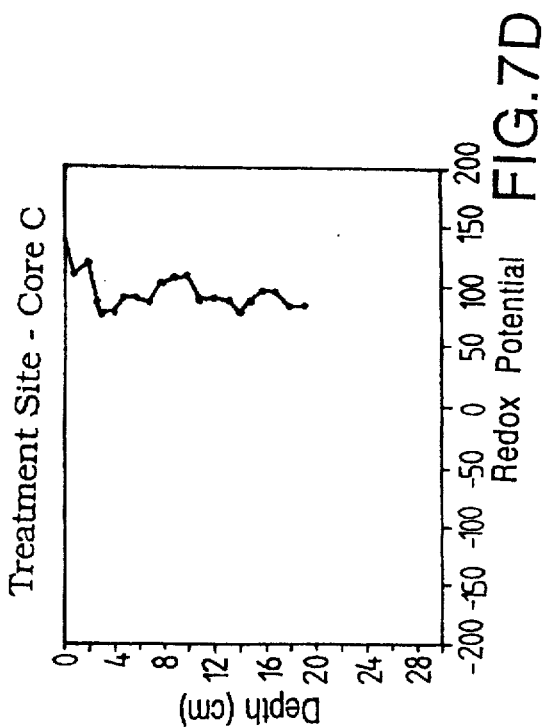
Figure 7D:
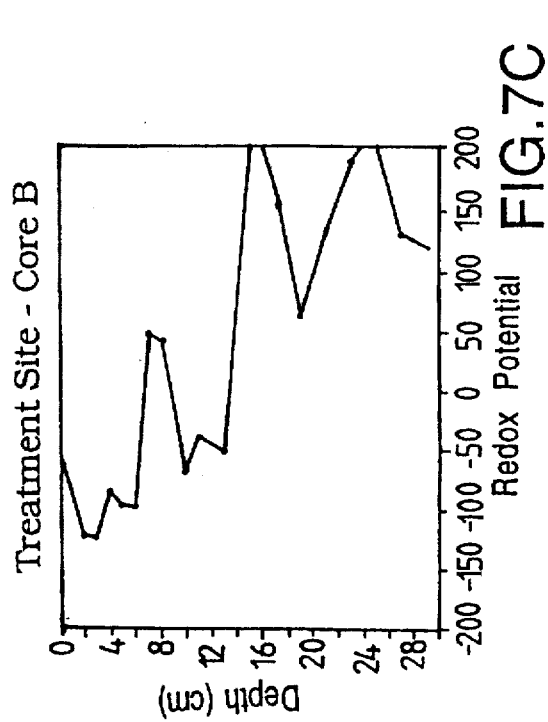

Unlike Hamilton Harbour, metals (FIGS. 5A through 5H) and the 16 priority pollutant polynuclear aromatic hydrocarbons (PAHs, Table 1) are comparatively dilute at the Bellevue Park test site in the St. Marys River (FIG. 6). However, sediment samples from near Bellevue Park have high concentrations of oil and grease (1.4%, 1.6% and 2.4%) and wood fibres.

A high concentration of a complex PAH (retene, 2 μg/g) was found in the St. Marys River sediments. Retene can occur naturally from degradation of conifers but it can also be associated with pulp and paper manufacturing. The concentrations of many of the priority pollutant chlorinated organic compounds is near or at background levels (Tables 2 and 3).

Decay of the wood fibre and other wastes results in a reducing environment as indicated by the black colour, high ammonia (1.5–2.3 mg/L), and low redox (FIGS. 7A through 7D). Note that the deeper sediments are more oxygenated. This observation reflects the relatively recent discharge of labile organic wastes over older more oxygenated sediments. Also note that the redox of the sediments changes seasonally. By November the surface sediments have become oxygenated (FIGS. 7A through 7D). It is a fortunate situation in that oxidation treatment of the surface sediments could not be compromised by diffusion of reduced materials such as hydrogen sulphide from deeper sediments. Also the required depth of treatment is only 15 cm.

TABLE 1

PAH Concentrations in Surficial Sediment of Bellevue Marine Park Area

|  | Sample Range (ng/g) |
|---|---|
| Naphthalene | 3137–6878 |
| Acenapthylene | 152–318 |
| Acenaphthene | 169–360 |
| Fluorene | 356–540 |
| Anthracene | 1913–3425 |
| Phenanthrene | 478–1227 |
| Fluoranthene | 2599–6831 |
| Pyrene | 2021–5485 |
| Chrysene | 1068–3269 |
| Benzo(a)anthracene | 1353–3680 |
| Benzo(b)fluoranthene | 2004–2223 |
| Benzo(k)fluoranthene | 1512–2202 |
| Benzo(a)pyrene | 964–3114 |
| Dibenzo(a,h)anthracene | 275–1040 |
| Indeno(1,2,3-cd)pyrene | 130–411 |
| Benzo(g,h,i)perylene | 370–1214 |
| Total PAHs | 16989–42019 |

TABLE 2

PCB Concentrations in Surficial Sediment of Bellevue Marine Park Area

|  | Sample Range (ng/g) |
|---|---|
| PCB 18 | ND–0.66 |
| PCB 52 | ND–5.13 |
| PCB 49 | ND–5.43 |
| PCB 44 | ND–3.69 |
| PCB 101 | 2.48–5.77 |
| PCB 151 | ND–9.23 |

TABLE 2-continued

PCB Concentrations in Surficial Sediment of Bellevue Marine Park Area

|  | Sample Range (ng/g) |
|---|---|
| PCB 118 + 149 | 2.29–15.57 |
| PCB 105 | ND–1.92 |
| PCB 138 | 2.91–6.36 |
| PCB 183 | ND–2.94 |
| PCB 194 | ND–0.85 |
| Total PCB | 80.43–299.28 |

TABLE 3

Organic Contaminant Concentrations in Surficial Sediment of Bellevue Marine Park Area

|  | Sample Range (ng/g) |  | Sample Range (ng/g) |
|---|---|---|---|
| 1,3 DCB | ND | Aldrin | ND |
| 1,4 DCB | ND | OCS | ND |
| 1,2 DCB | ND | g Chlordane | ND |
| HCB | ND | o,p DDE | ND |
| 1,3,5 TCB | ND | a Endosulfan | ND |
| 1,2,4 TCB | ND | a Chlordane | ND |
| 1,2,3 TCB | ND | t Nonachlor | ND |
| 1,2,3,5 TECB | ND | Dieldrin | ND |
| 1,2,4,5 TECB | ND | p,p' DDE | 1.97–3.17 |
| 1,2,3,4 TECB | ND | o,p' DDD | ND |
| PECB | ND | Endrin | ND |
| 2,3,4,6 TECB | ND | B Endosulfan | ND |
| A BHC | 1.66–4.14 | p,p' DDD | 1.22–3.32 |
| HCB | ND | o,p' DDD | ND |
| PECA | ND | Methoxychlor | ND |
| Lindane | ND | Mirex | ND |
| Heptachlor | ND |  |  |

Figure 8:
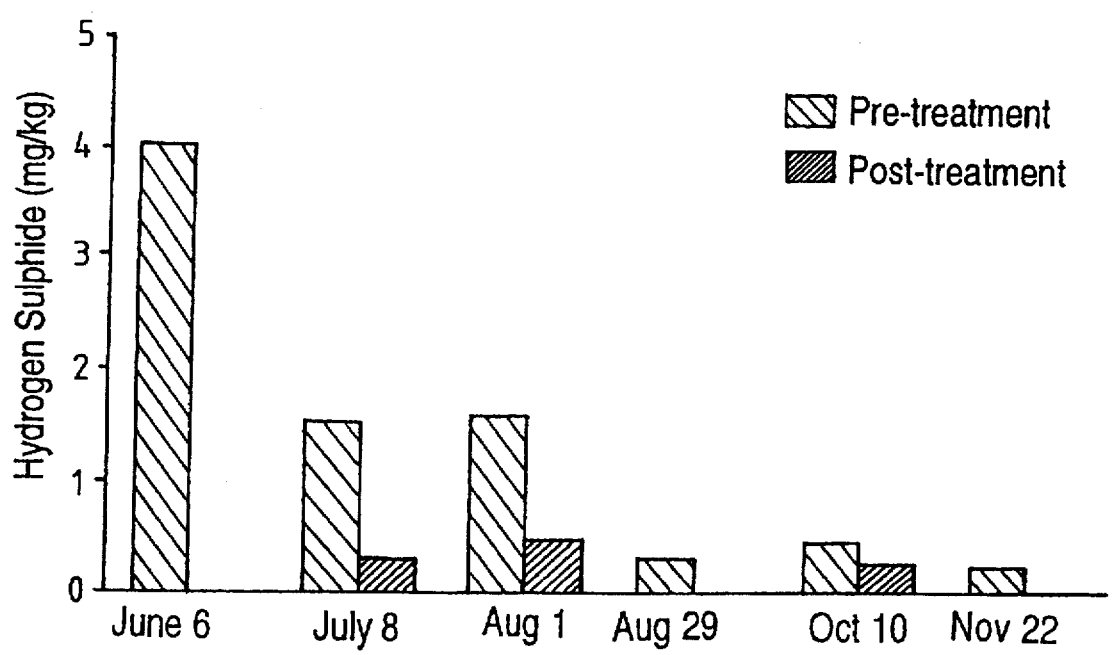
FIG. 8 is a histogram illustrating the effect of ferric chloride on sediment hydrogen sulphide for the St. Marys River treatment.

The highest observed concentration of hydrogen sulphide in the sediment was in June (FIG. 8). By the end of August most of the hydrogen sulphide had been oxidized. The sediment treatment with ferric chloride greatly reduced the concentration of hydrogen sulphide.

Figure 11:
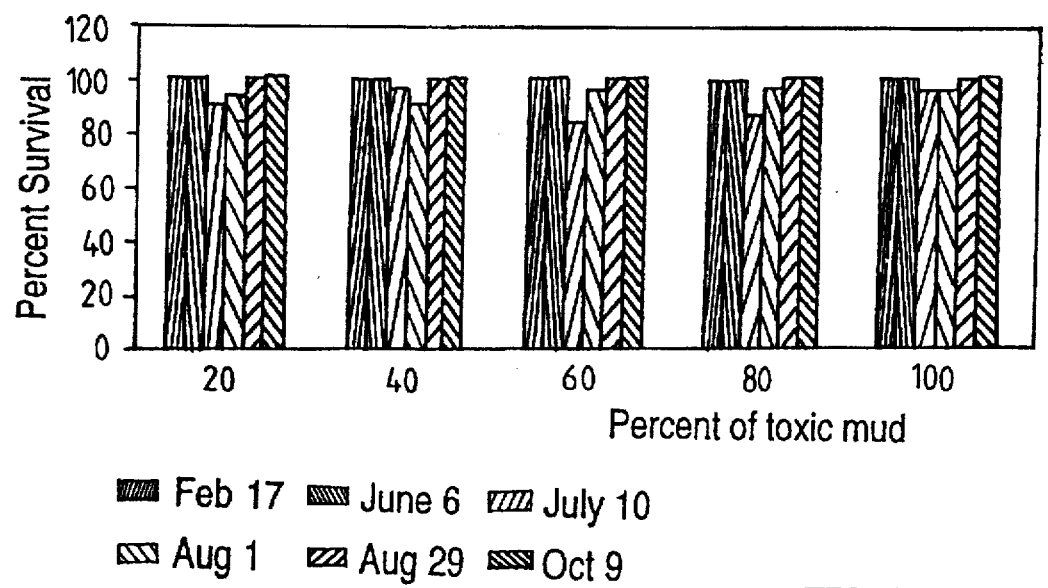
FIG. 11 is a histogram illustrating the *Daphnia magna* bioassay results illustrating the average percent survival.
Figure 12:
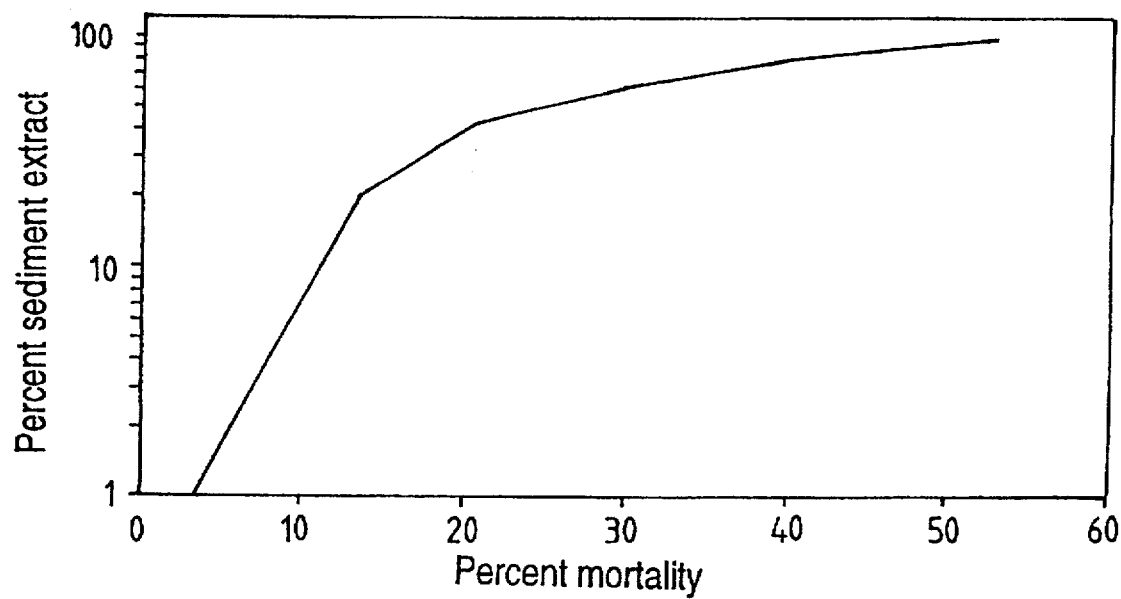
FIG. 12 is a graph illustrating the percent mortality for the DMSO/methanol sediment extract.

The ATP-TOX bioassay indicated a seasonal change in toxicity (FIG. 9) that closely matched that of the hydrogen sulphide concentration. Also, the ferric chloride treatment reduced the toxicity of the ATP-TOX bioassays in tandem with the hydrogen sulphide complexation. *Photobacterium Phosphoreum* bioassays also indicated a seasonal change in toxicity but they were not done as intensively as the ATP-TOX bioassays (FIGS. 10A through 10H). *Daphnia magna* bioassays with aqueous extracts indicated no toxicity (FIG. 11) but some DMSO extracts with Daphnia could measure toxicity (FIG. 12).

Two other bioassays indicated little or no toxicity. Dilution bioassays with Hexagenia (mayfly nymphs) from four field trips in 1991 (February, June, July, and August) indicated no toxicity. Bioassays with *Lactuca sativa* (lettuce) detected little toxicity. These latter bioassays are not sensitive to hydrogen sulphide toxicity.

The bioassay results were not as clear as visual inspection of the site was. Very few benthic invertebrates were seen; the sediments were virtually sterile to organisms. The main acute toxin is hydrogen sulphide and some laboratory bioassays cannot detect this toxin.

Figure 13:
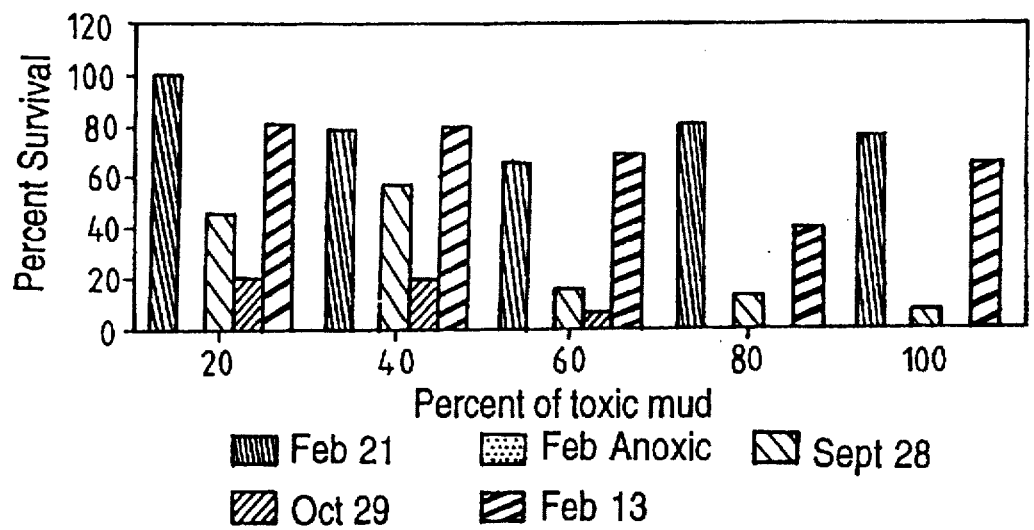
FIG. 13 is a histogram illustrating the average percent survival for *Daphnia magna* bioassay results for the Hamilton Harbour Stelco Hotspot site #1.
Figure 14:
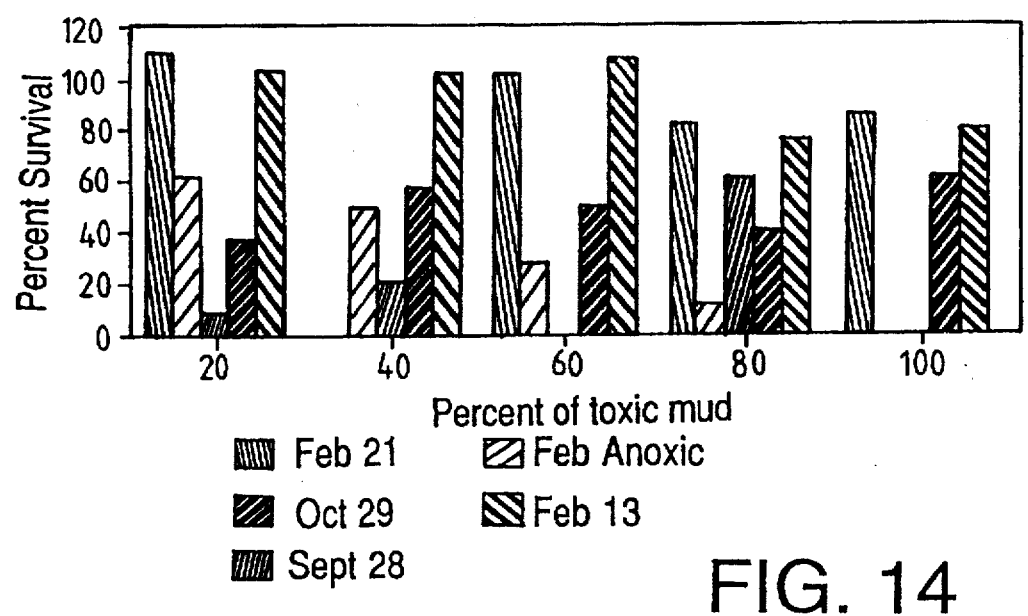
FIG. 14 is a histogram illustrating the average percent survival for *Daphnia magna* bioassay results for the Hamilton Harbour Stelco Hotspot site #2.
Figure 15:
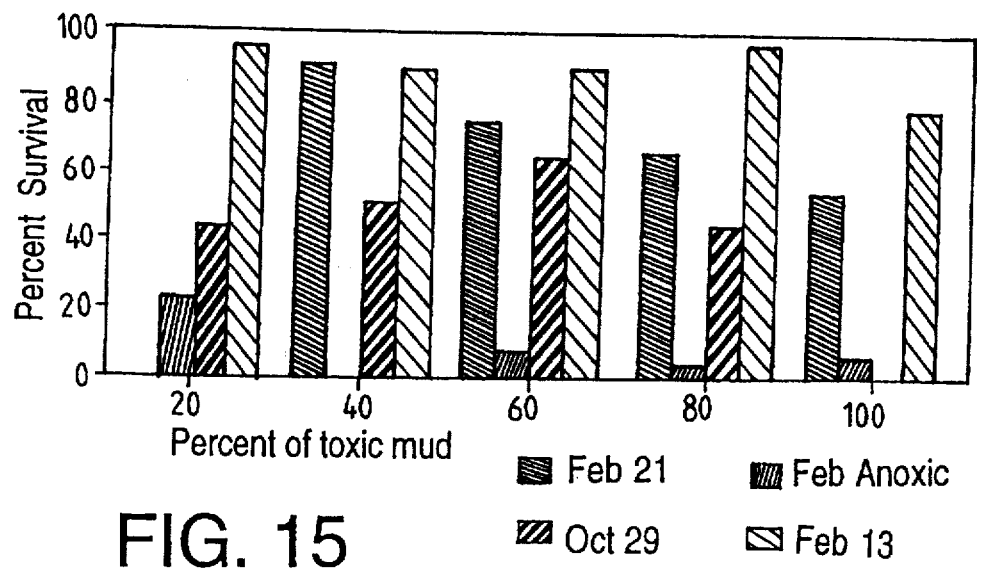
FIG. 15 is a histogram illustrating the average percent survival for *Daphnia magna* bioassay results for the Hamilton Harbour Stelco Hotspot site #3.
Figure 16:
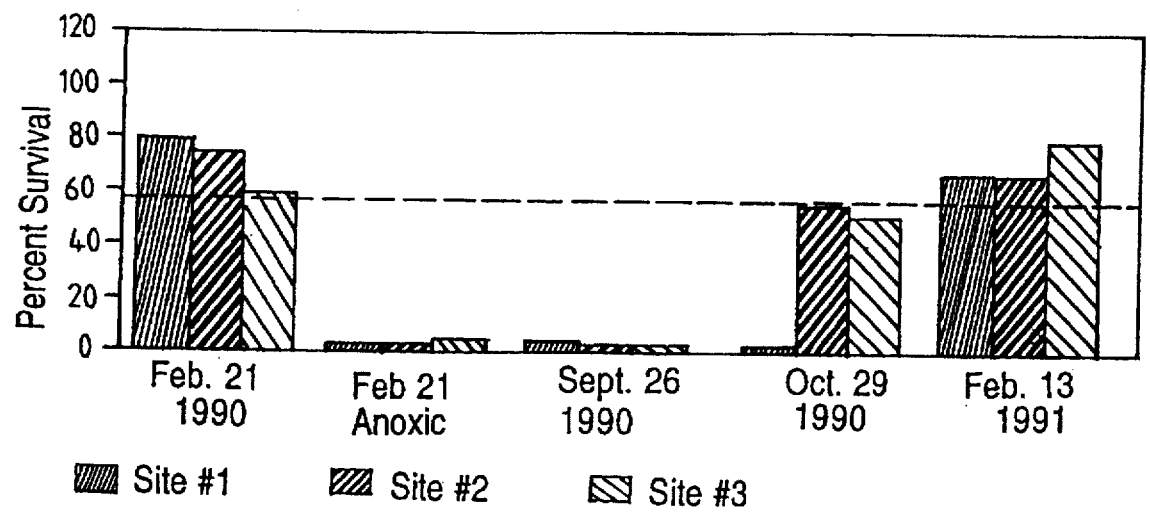
FIG. 16 is a histogram illustrating the results of FIGS. 13, 14 and 15.

Three sets of Daphnia toxicity dilution experiments in Hamilton Harbour also observed a seasonal change in sediment toxicity (FIGS. 13, 14 and 15). Some variation exists and the trends are more obvious by looking at the average toxicity (FIG. 16). In winter, these sediments have little toxicity. However, if these winter samples are purged with nitrogen, then sealed for a month to go anoxic, then bubbled with air for 2–3 h to oxygenate them, they are highly toxic. This length of oxygenation provides oxygen saturation but it is less than the half life of hydrogen sulphide oxidation (19 h).

By late fall, the sediment samples from the Stelco Hotspot were still highly toxic. These observations differ from the St. Marys River sediments where hydrogen sulphide toxicity was almost gone by late August. The differences in extremes of hydrogen sulphide concentrations support the hypothesis that the Stelco Hotspot with 100 mg/L of hydrogen sulphide will stay toxic for much longer than the St. Marys River sediments with 4 mg/L hydrogen sulphide.

Figure 17:
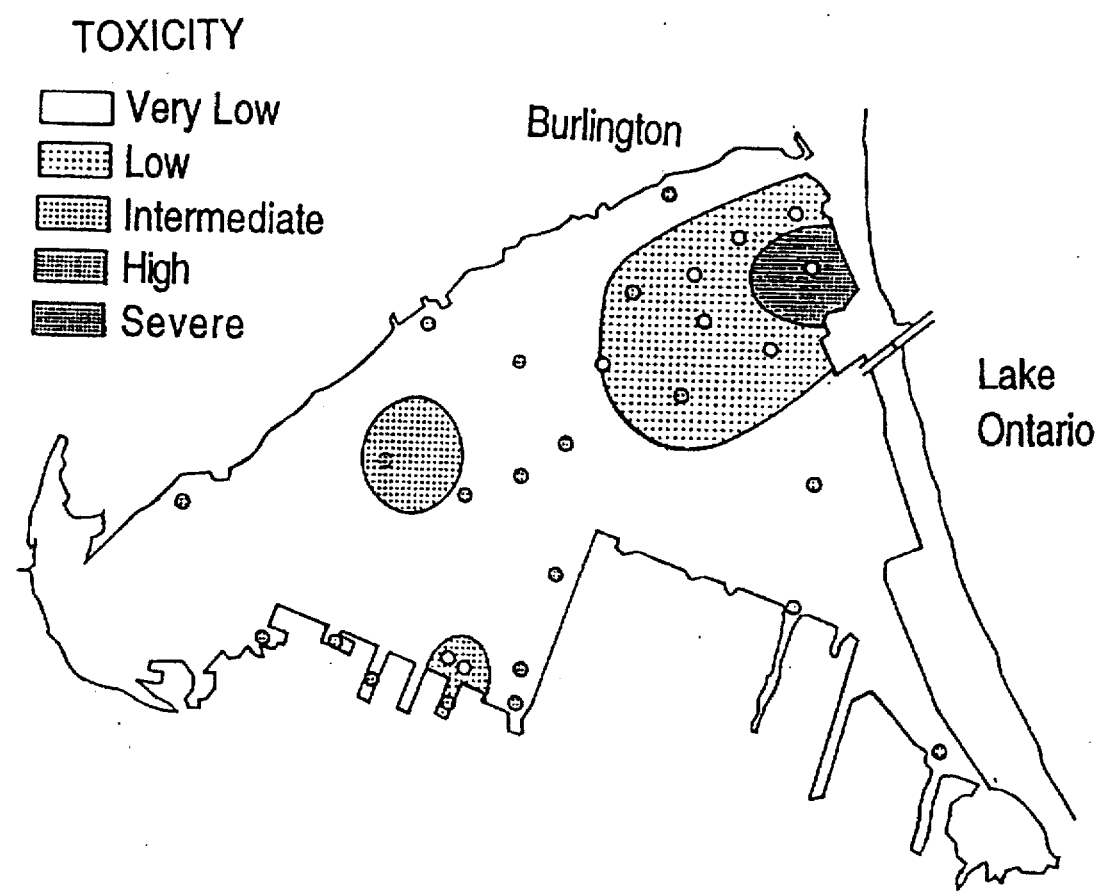
FIG. 17 is an illustration of the toxicity severity of Hamilton Harbour.
Figure 18:
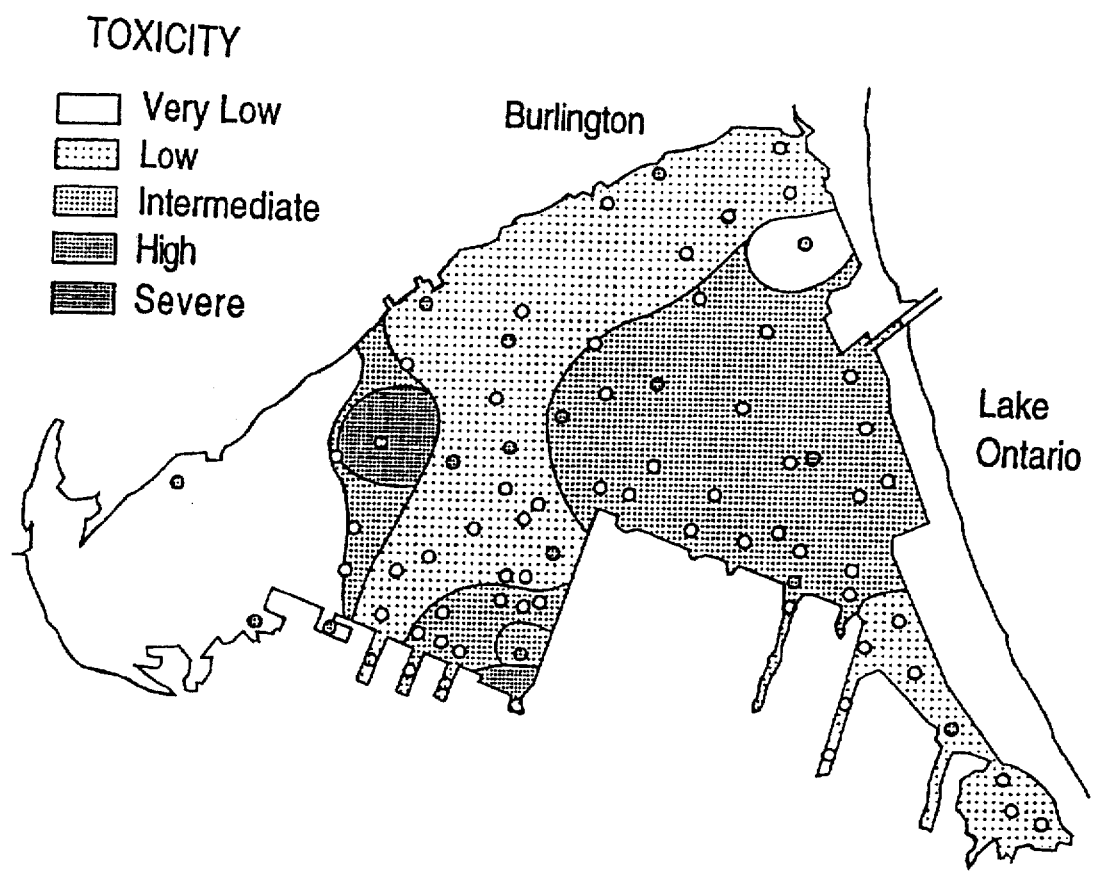
FIG. 18 is an illustration of the toxicity of Hamilton Harbour sediments for photobacterium.

New toxicity maps with *Daphnia magna* (FIG. 17) and *Photobacterium Phosphoreum* (FIG. 18) indicate much less toxicity than earlier maps (Brouwer et al. 1990). The new maps are done from analyses of surface sediment (0–1 cm), whereas the old maps were done from analyses of Ekman dredge samples (0–15 cm). In part, the surface sediments have less contaminants, but the deeper sediments have less access to oxygen and anoxic decay produces hydrogen sulphide.

If the acute toxicity is controlled by hydrogen sulphide, then no biodegradation occurs in the deeper sediments and some occurs at a suppressed rate in the most recent sediments. The proof of this last hypothesis is found in the PAH data. The surface sediments have much less naphthalene than the deeper sediments (Tables 4 and 5). Naphthalene is biodegradable (Murphy et al. 1992). Some recovery from source control is occurring, but it is slow. The rate of recovery is uncertain in the deep basin. The deeper sediments of the Stelco Hotspot, i.e., >2 cm deep are not recovering and will likely remain uninhabitable to benthos for decades.

TABLE 4

PAHs in Hamilton Harbour surface sediments (0–1 cm) collected in 1991
Murphy HAMILTON HARBOUR PAHs conc. ug/g Sediment Samples Summer 1991

|  | proc. blk | site 41 | site 80 | site 47 | site 76 | site 74 | site 9 | site 2 |
|---|---|---|---|---|---|---|---|---|
| NAPHTHALENE | <0.01 | 0.61 | 0.24 | 3.86 | 0.11 | 0.15 | 1.14 | 0.15 |
| ACENAPHTHYLENE | ND | 0.12 | 0.02 | 1.27 | 0.02 | 0.04 | 0.20 | 0.03 |
| ACENAPHTHENE | ND | 0.05 | 0.02 | 1.53 | 0.03 | 0.04 | 0.25 | 0.06 |
| FLUORENE | ND | 0.14 | 0.04 | 2.72 | 0.05 | 0.09 | 0.29 | 0.06 |
| PHENANTHRENE | <0.01 | 1.32 | 0.37 | 22.59 | 0.42 | 0.86 | 1.66 | 0.51 |
| ANTHRACENE | ND | 0.20 | 0.03 | 5.01 | 0.07 | 0.18 | 0.41 | 0.08 |
| FLUORANTHENE | <0.01 | 3.38 | 0.86 | 50.36 | 0.85 | 1.86 | 4.33 | 1.02 |
| PYRENE | <0.01 | 3.01 | 0.76 | 41.07 | 0.74 | 1.61 | 4.04 | 0.88 |
| BENZ(a)ANTHRACENE | <0.01 | 1.66 | 0.39 | 33.54 | 0.47 | 0.82 | 2.56 | 0.40 |

TABLE 4-continued

PAHs in Hamilton Harbour surface sediments (0–1 cm) collected in 1991
Murphy HAMILTON HARBOUR PAHs conc. ug/g Sediment Samples Summer 1991

| | | | | | | | | |
|---|---|---|---|---|---|---|---|---|
| CHRYSENE | <0.01 | 2.16 | 0.56 | 4.36 | 0.61 | 1.05 | 3.00 | 0.62 |
| BENZO(B)FLUORANTHENE | <0.01 | 6.27 | 0.05 | 57.34 | 0.76 | 1.83 | 0.20 | 0.34 |
| BENZO(K)FLUORANTHENE | <0.01 | 0.77 | 0.57 | 41.60 | 0.55 | 0.68 | 3.26 | 0.49 |
| BENZO(A)PYRENE | <0.01 | 2.40 | ND | 89.29 | 0.31 | 0.23 | 3.75 | 0.15 |
| INDENO(1,2,3-cd)PYRENE | ND | 0.51 | ND | 179.22 | 0.17 | ND | 0.42 | 0.05 |
| DIBENZ(a,h)ANTHRACENE | ND | 0.60 | ND | 16.85 | 0.13 | ND | 0.40 | 0.02 |
| BENZO(g,h,i)PERYLENE | ND | 1.05 | 0.07 | 111.47 | 0.31 | 0.05 | 1.42 | 0.13 |
| TOTALS | <0.01 | 24.25 | 3.98 | 662.10 | 5.60 | 9.48 | 27.35 | 4.98 |

| | site 25 | site 15 | site 45 | site 9R | site 57 | site 28 | site 19 | site 55 |
|---|---|---|---|---|---|---|---|---|
| NAPHTHALENE | 2.39 | 0.31 | 1.43 | 0.68 | 0.46 | 0.71 | 0.04 | 0.09 |
| ACENAPHTHYLENE | 0.76 | 0.11 | 0.46 | 0.14 | 0.22 | 0.24 | 0.01 | 0.02 |
| ACENAPHTHENE | 0.26 | 0.11 | 0.54 | 0.17 | 0.14 | 0.18 | <0.01 | 0.01 |
| FLUORENE | 0.76 | 0.14 | 0.96 | 0.20 | 0.28 | 0.36 | 0.01 | 0.02 |
| PHENANTHRENE | 4.18 | 0.95 | 8.12 | 1.19 | 2.56 | 2.93 | 0.07 | 0.15 |
| ANTHRACENE | 1.06 | 0.19 | 2.21 | 0.24 | 0.16 | 0.18 | 0.01 | 0.05 |
| FLUORANTHENE | 17.26 | 2.07 | 11.53 | 3.11 | 4.86 | 5.22 | 0.17 | 0.39 |
| PYRENE | 17.41 | 1.85 | 9.10 | 2.80 | 4.11 | 4.44 | 0.15 | 0.35 |
| BENZ(a)ANTHRACENE | 15.79 | 1.14 | 4.85 | 1.65 | 2.03 | 2.52 | 0.07 | 0.16 |
| CHRYSENE | 16.15 | 1.37 | 5.33 | 2.04 | 2.53 | 2.77 | 0.09 | 0.22 |
| BENZO(B)FLUORANTHENE | 17.75 | 0.02 | 0.34 | 0.03 | 0.41 | 2.84 | 0.22 | 0.13 |
| BENZO(K)FLUORANTHENE | 17.57 | 0.99 | 4.69 | 1.89 | 1.73 | 1.48 | 0.08 | 0.17 |
| BENZO(A)PYRENE | 26.62 | 0.80 | 6.77 | 2.05 | 5.42 | 0.25 | 0.08 | 0.19 |
| INDENO(1,2,3-cd)PYRENE | 6.18 | 0.05 | 0.64 | 0.70 | 0.40 | ND | ND | 0.01 |
| DIBENZ(a,h)ANTHRACENE | 3.03 | 0.01 | 0.31 | 0.12 | 0.05 | ND | <0.01 | ND |
| BENZO(g,h,i)PERYLENE | 12.44 | 0.16 | 2.19 | 0.65 | 0.30 | 0.12 | ND | <0.01 |
| TOTALS | 159.60 | 10.26 | 59.47 | 17.67 | 25.64 | 24.26 | 0.98 | 1.96 |

| | site 36 | site 28R | site 48 | site 29 | site 53 | site 37 | site 61 | site 61R |
|---|---|---|---|---|---|---|---|---|
| NAPHTHALENE | 0.83 | 1.00 | 84.82 | 0.41 | 0.36 | 1.17 | 0.65 | 0.84 |
| ACENAPHTHYLENE | 0.25 | 0.36 | 2.31 | 0.14 | 0.08 | 0.28 | 0.07 | 0.09 |
| ACENAPHTHENE | 0.17 | 0.20 | 14.24 | 0.10 | 0.06 | 0.18 | 0.16 | 0.21 |
| FLUORENE | 0.44 | 0.39 | 21.14 | 0.21 | 0.12 | 0.38 | 0.27 | 0.37 |
| PHENANTHRENE | 3.56 | 3.13 | 154.48 | 2.07 | 1.16 | 3.44 | 2.25 | 3.23 |
| ANTHRACENE | 1.10 | 1.00 | 56.41 | 0.52 | 0.27 | 0.87 | 0.38 | 0.55 |
| FLUORANTHENE | 6.76 | 5.79 | 167.90 | 3.77 | 2.21 | 6.28 | 3.20 | 4.72 |
| PYRENE | 5.68 | 4.90 | 139..67 | 3.21 | 1.91 | 5.37 | 2.70 | 3.95 |
| BENZ(a)ANTHRACENE | 3.05 | 3.21 | 90.37 | 1.85 | 0.98 | 3.07 | 1.44 | 2.10 |
| CHRYSENE | 3.56 | 3.38 | 80.68 | 2.22 | 1.26 | 3.72 | 1.95 | 2.70 |
| BENZO(B)FLUORANTHENE | 1.07 | 3.70 | 154.33 | 3.30 | 1.66 | 6.11 | 5.06 | 4.71 |
| BENZO(K)FLUORANTHENE | 1.76 | 3.25 | 89.25 | 2.33 | 1.08 | 3.69 | 1.51 | 2.33 |
| BENZO(A)PYRENE | 2.62 | 3.99 | 133.00 | 2.42 | 0.93 | 4.34 | 2.03 | 3.11 |
| INDENO(1,2,3-cd)PYRENE | ND | 5.97 | 304.70 | 0.92 | 0.21 | 1.24 | 1.16 | 2.92 |
| DIBENZ(a,h)ANTHRACENE | ND | 0.74 | 37.94 | 0.30 | 0.07 | 0.38 | 0.36 | 0.70 |
| BENZO(g,h,i)PERYLENE | 0.00 | 2.19 | 135.42 | 1.12 | 0.35 | 1.82 | 1.17 | 2.41 |
| TOTALS | 30.91 | 43.19 | 1,666.67 | 24.91 | 12.70 | 42.34 | 24.37 | 34.96 |

TABLE 5

PAHs in Ekman Dredge Samples - Stelco Hotspot

| | February 1990 | | | October 1990 | |
|---|---|---|---|---|---|
| Compound | Dredge Site #1 | Dredge Site #2 | Dredge Site #3 | Dredge Site #1 | *Core Site #1 |
| NAPHTHALENE | 2718.9 | 2042.1 | 10263.5 | 5457.8 | 2925.7 |
| ACENAPHTHYLENE | 13.5 | 19.2 | 16.4 | 8.3 | 14.7 |
| ACENAPHTHENE | 19.9 | 6.0 | 60.0 | 27.9 | 3.3 |
| FLUORENE | 8.6 | 19.0 | 13.3 | 27.1 | 15.5 |
| PHENANTHRENE | 79.6 | 64.7 | 179.0 | 72.8 | 48.5 |
| ANTHRACENE | 24.8 | 22.9 | 53.6 | 25.7 | 17.7 |
| FLUORANTHENE | 78.1 | 54.7 | 139.1 | 59.1 | 38.2 |
| PYRENE | 42.9 | 29.2 | 76.3 | 42.6 | 27.6 |
| BENZOaANTHRACENE | 41.1 | 24.6 | 59.4 | 20.0 | 12.3 |
| CHRYSENE | 40.3 | 23.1 | 55.0 | 20.1 | 12.5 |
| BbFLUORANTHENE | 42.0 | 21.0 | 58.1 | 14.5 | 7.2 |
| BkFLUORANTHENE | 26.4 | 15.7 | 30.1 | 9.5 | 4.9 |
| BaPYRENE | 38.9 | 20.7 | 49.7 | 12.9 | 6.4 |
| INDENOPYRENE | 24.3 | 13.1 | 30.5 | 8.6 | 4.3 |
| DIBENZOANTHRACENE | 4.6 | 3.1 | 5.9 | 2.5 | 1.6 |
| BENZOPERYLENE | 22.0 | 11.1 | 27.6 | 8.1 | 3.6 |
| TOTAL (µg/g) | 3225.7 | 2390.1 | 11117.6 | 5817.5 | 3143.9 |

*Combined

Two sediment injection trials were conducted in the St. Marys River near Bellevue Park. The first trial was relatively successful but modifications were made to improve efficiency before the second injection trial. The system, described herein previously, for injecting iron into sediments was built and tested for the first time in the St. Marys River on Jul. 10, 1991. The system had the capacity to treat a large area; three 45-gallon barrels of ferric chloride were injected in less than an hour over an area 90 m by 12 m. The equipment was tough in that it survived bouncing over logs and other debris. In spite of minor engineering problems, the equipment worked well. The colour of the iron in the sediment cores indicated that the top 9 cm of sediments were treated. Refinements in the pumping equipment were needed before larger areas could be treated. The chemical pump required an air compressor and only large ones were available from rental agencies. A compact Honda air compressor was bought to provide more free deck space. The pore size of the nozzles was large; to pressurize the manifold to achieve equal flow through all nozzles, the flow rate of ferric chloride was higher than planned.

Figure 9:
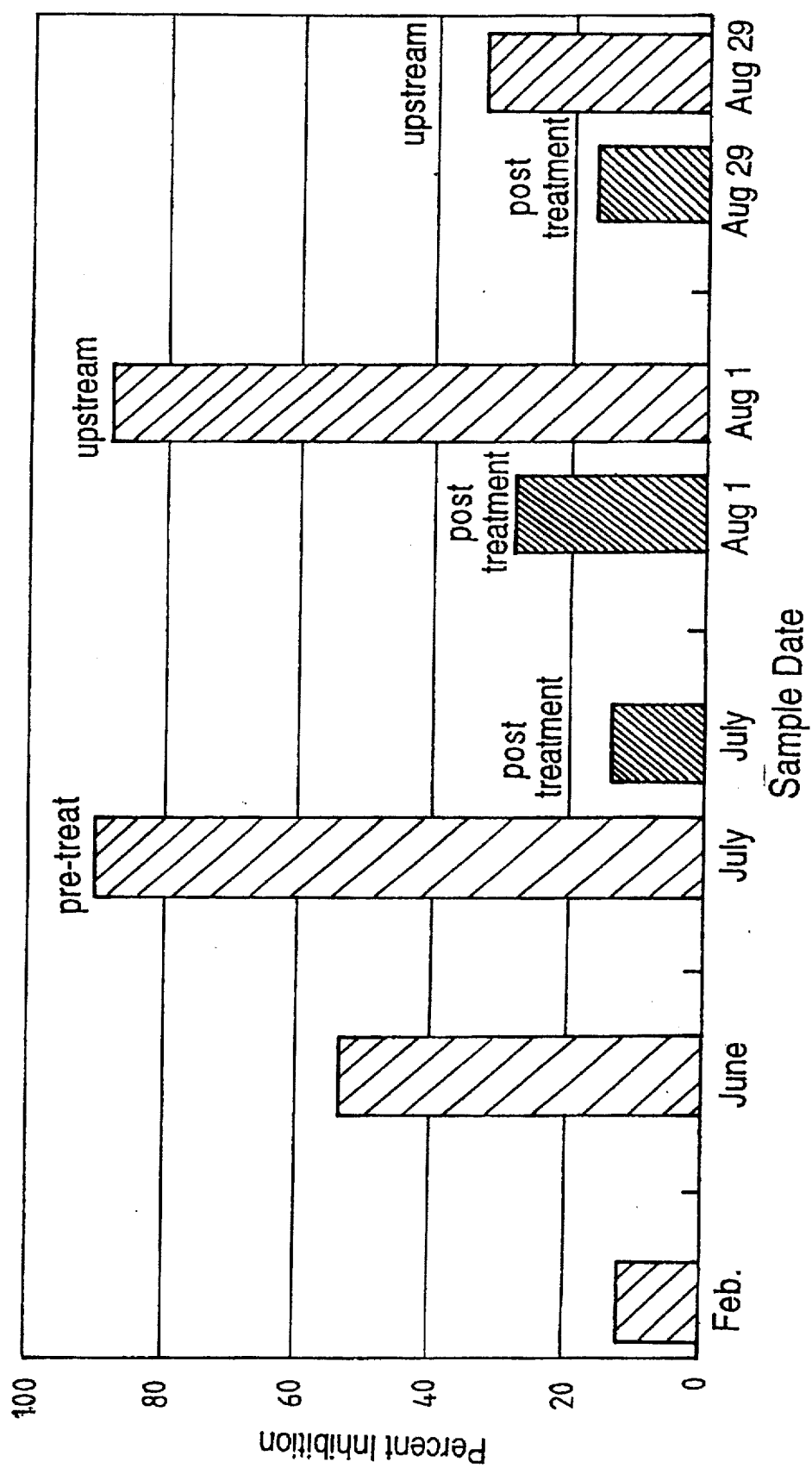
FIG. 9 is a histogram illustrating the ATP-TOX results from Sault Ste. Marie for the first ferric chloride sediment injection.
Figure 10B:
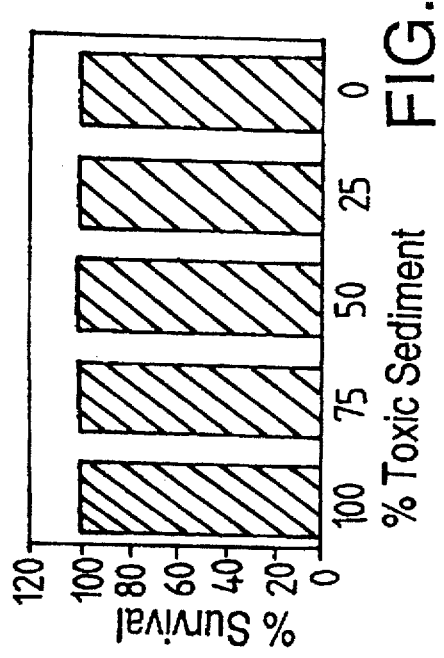
FIGS. 10A through 10H represent a series of histograms illustrating the sediment toxicity of photobacterium phosphoreum bioassay for data gathered at St. Marys River.
Figure 10D:
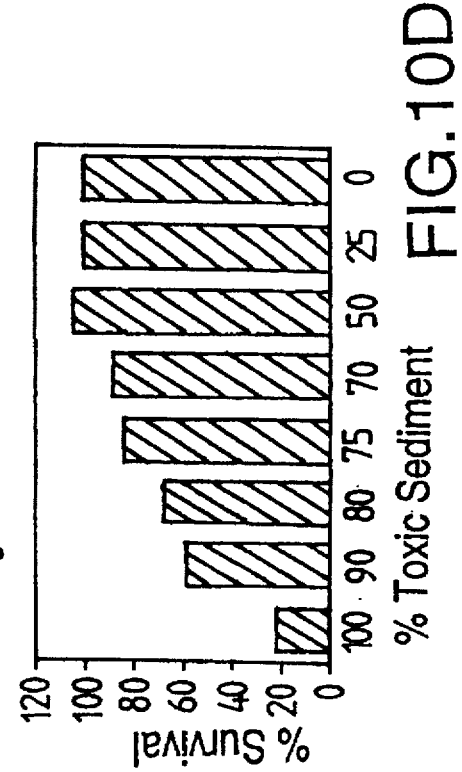
Figure 10A:
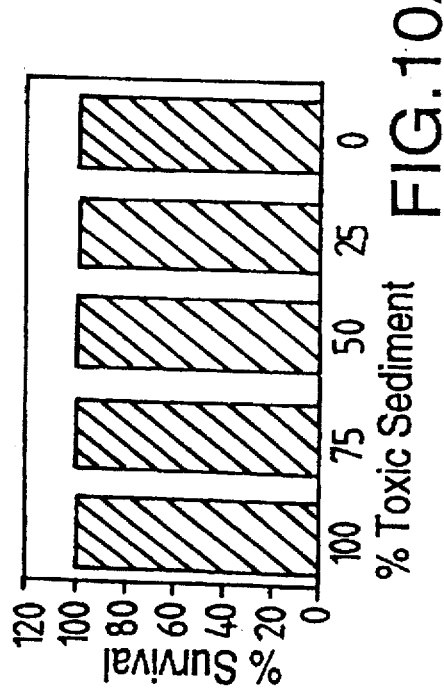
Figure 10C:
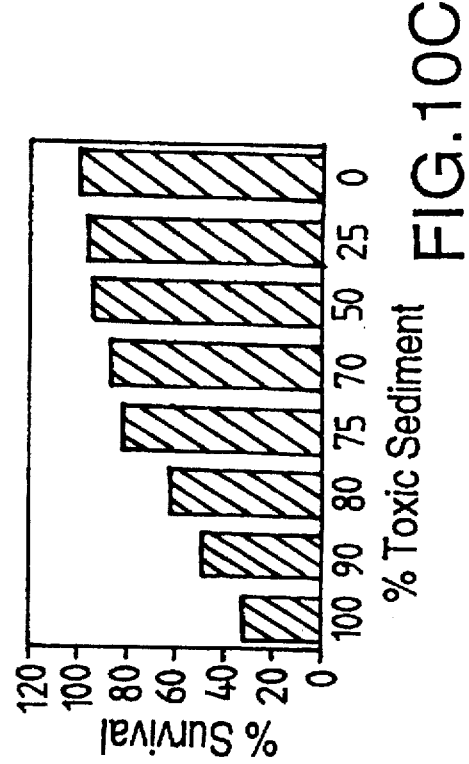
Figure 10F:
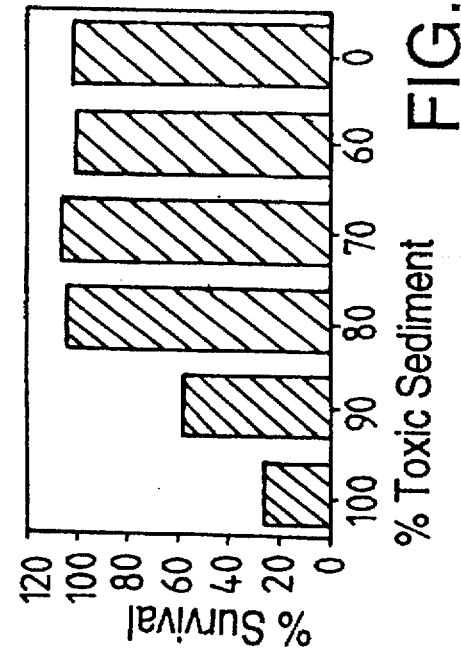
Figure 10H:
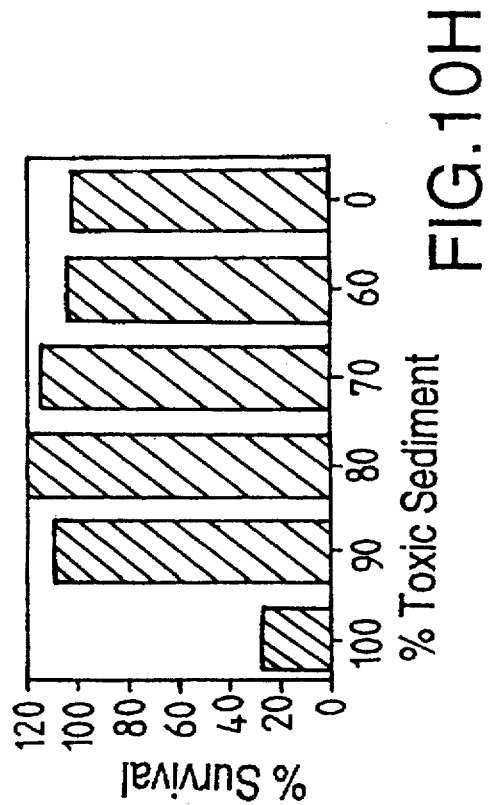
Figure 10E:
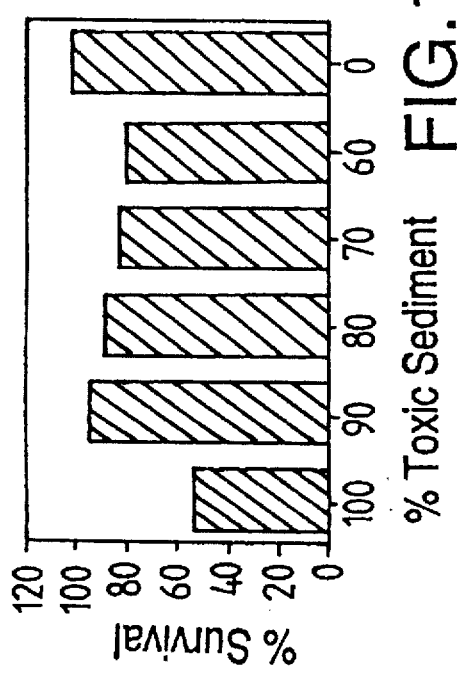
Figure 10G:
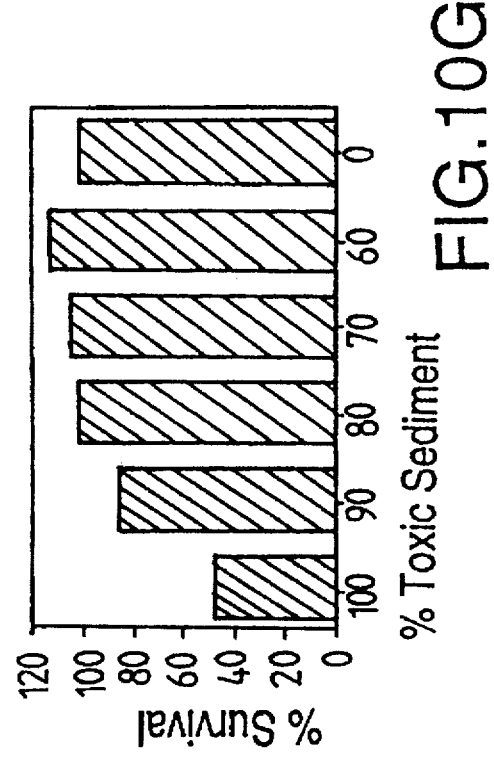

Divers recorded with cameras that the sediments were not resuspended into the water column. A pressure wave proceeding the injection bar raised the sediments about 20 cm, but they fell back with minimal resuspension to the upper waters. Sediment trap analysis confirms that no sediment moved to the water surface (Table 6). A large amount of gas reached the surface and small patches of oily film formed. Some macrophytes (primarily *Elodea canadensis*) were broken by the injection bar, but most remained intact. The sediments need to be studied in more detail but the ATP-TOX bioassay indicated a reduction in acute toxicity after the ferric chloride treatment (FIG. 9).

TABLE 6

Summary of Sediment Trap Data - St. Marys River Chemical Treatments

| Sediment Traps (g) July 8, 1991 | | | Sediment Traps (g) Oct 10, 1991 | |
|---|---|---|---|---|
| Upstream | Downstream | | Upstream | Downstream |
| 0.122 | 0.182 | | 0.066 | 0.049 |
| 0.140 | 0.169 | | 0.064 | 0.029 |
| 0.154 | 0.144 | | 0.047 | 0.074 |
| 0.081 | 0.158 | | 0.048 | 0.081 |
| 0.497 | 0.653 | Total | 0.225 | 0.233 |
| 0.124 | 0.163 | Average | 0.056 | 0.058 |
|  | +31.4 | % Dif |  | +3.6 |
| Surface Water (g/L) July 8, 1991 | | | Surface Water (g/L) Oct 10, 1991 | |
| Upstream | Downstream | | Upstream | Downstream |
| 0.003 | 0.004 | | 0.0017 | 0.0015 |

On October 6, a second ferric chloride injection was done north of the first site to an area 200 m by 36 m. Smaller nozzles (0.031 inch diameter orifice) were used to maintain a high back pressure in the injection manifold and a constant flow through all the nozzles. The skids on the injection bar were not used so that the injection bar could penetrate deeper into the sediments. Visual observations indicated that the surface 15 cm of sediments were treated. Observations that with the boom configuration, the boat could not move faster than 0.5 m/s or the injection manifold would rise above the sediments.

EXAMPLE 2

CALCIUM NITRATE INJECTION

Calcium nitrate is about 100,000 times more water soluble than oxygen. The following reaction is mediated by bacteria:

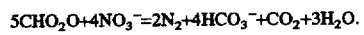

Figure 19:
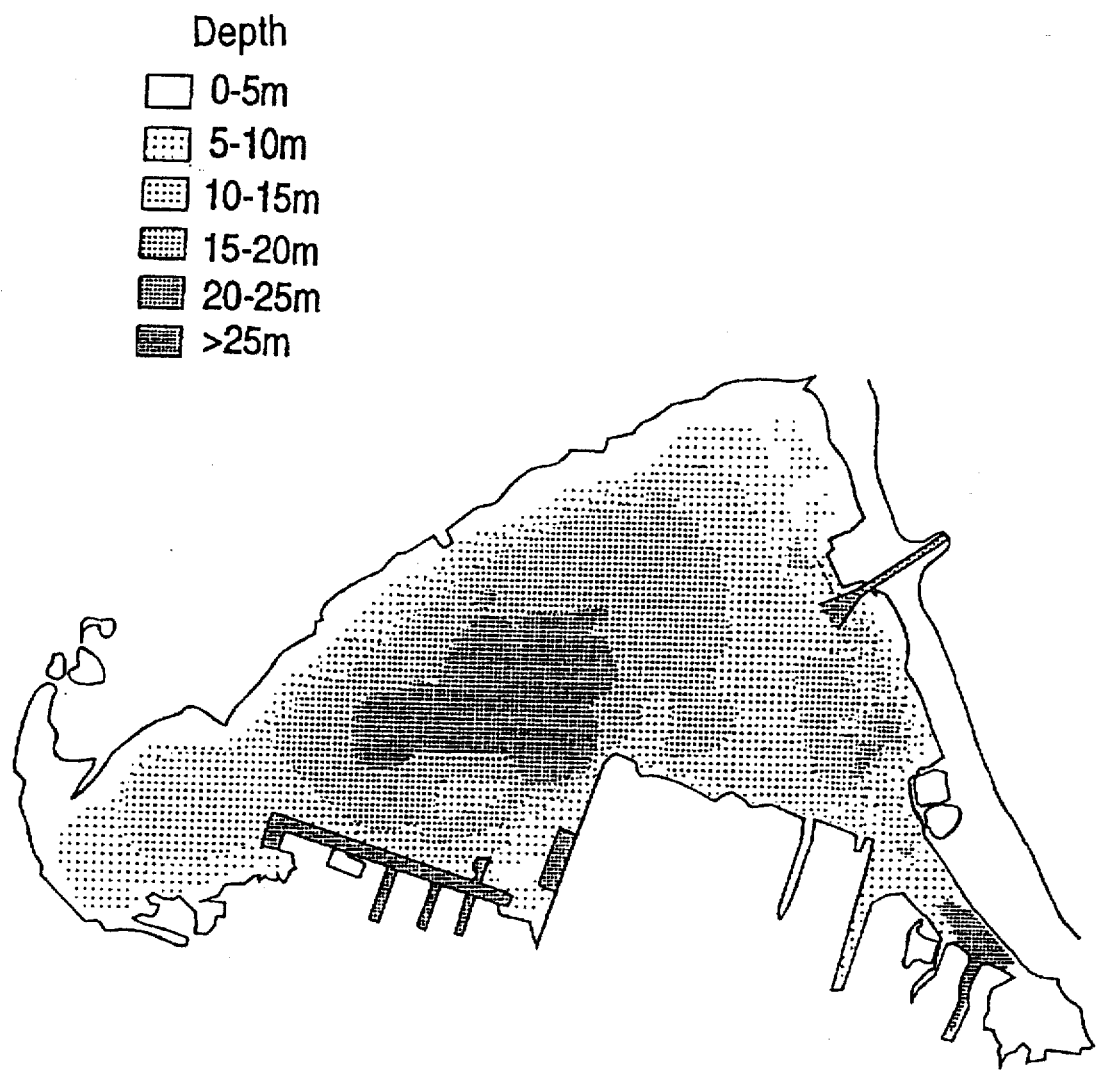
FIG. 19 is an illustration of the Hamilton Harbour sediment injection site.

Surface sediments (1–50 cm) from the St. Marys River were collected near Bellevue Park as illustrated in FIG. 6. Surface sediments (0–15 cm) were collected from the deep basin of Hamilton Harbour as illustrated in FIG. 19. Sediments were collected with either a Shipek dredge, or a Tech Ops corer. In Hamilton, samples were returned to NWRI and placed in either a fridge or 12° C. incubator. In Sault Ste. Marie, samples were quickly placed in a cooler and stored in a fridge in the Great Lakes Forestry Institute. Samples were always placed in coolers and shipped quickly. Sediment cores were subdivided within 24 h. Sediment samples were placed in clean pails with lids and enough sediment was added to exclude air. Sample processing for bioassays included homogenization with larger mixer and subsequent handling in a glove box in a fumehood. Sampling of reactors was done in a glovebox after purging it with nitrogen.

Various bottles were tried. The first trials used 300 mL BOD bottles to incubate and measure microbial utilization of nitrate. Each sample was unique in that after opening the top, the sample was not reincubated. The microbial metabolism incubations were run using 300 mL BOD bottles with and without 100 mg N/L of calcium nitrate. The short-term experiments were successful, but the production of gas ruined longer incubations by popping the lids. Both 155 mL and 250 mL septum fitted bottles were used in subsequent trials for incubations with 500 mg/L N—$NO_3$. Biodegradation experiments were run in 155 mL glass bottles with serum caps and a 20 mL nitrogen headspace, with and without 500 mg/L N calcium nitrate. The nitrogen headspace was sampled with gas tight syringes after relatively short-term incubations (2–6 weeks).

For all incubations, the sediments from the St. Marys River were mixed with deoxygenated water from St. Marys River and the Hamilton Harbour sediments were mixed with dechlorinated deoxygenated Burlington City water to form a 50% slurry. All the above sediments were shaken continuously on an end-over-end shaker. In one trial to measure the production of ammonia, 2 L jars were used for incubations with 500 mg/L N—$NO_3$; these sediments were shaken once a day (except some weekends).

The sediment slurry was centrifuged and the supernatant was filtered and processed using an ion chromatograph to determine nitrate and sulphate concentrations. The pH of samples was measured with a pH meter. Ammonia was analyzed by colorimetric analysis (Solorzano 1969).

Volatile organic compounds in the headspace were measured by GC/MS in the Waste Water Treatment Centre (WTC) laboratory (Brian MacGillivray). Each assay was processed with five replicate bottle incubations and the headspace subsamples were combined. For one experiment two sets of five replicates were processed to determine the analytical error; it was insignificant. Sediment samples for hydrogen sulphide analyses were frozen and delivered to Guelph Chemical Laboratories. These samples were purged with helium without any pH treatment; the hydrogen sulphide was trapped in a cold trap and injected for analysis into a GC/MS.

"Oil and grease and total petroleum hydrocarbons" was measured with a derivative of the Environment Canada (1979) protocol. "Total petroleum hydrocarbon" was measured by a gas chromatography method. Sodium sulphate was used to dry the samples. Dichloromethane was used to extract the samples with 10 cycles/h in a Soxhlet extractor for 8 h with a water bath at 25° C.

Photobacterium bioassays were run on whole sediments (Brouwer et al. 1990). Dilutions for $LC_{50}$ analysis were done with clean sediments from Long Point, Lake Erie.

RESULTS—ENHANCEMENT OF MICROBIAL METABOLISM

St. Marys River Sediments

Figure 20:
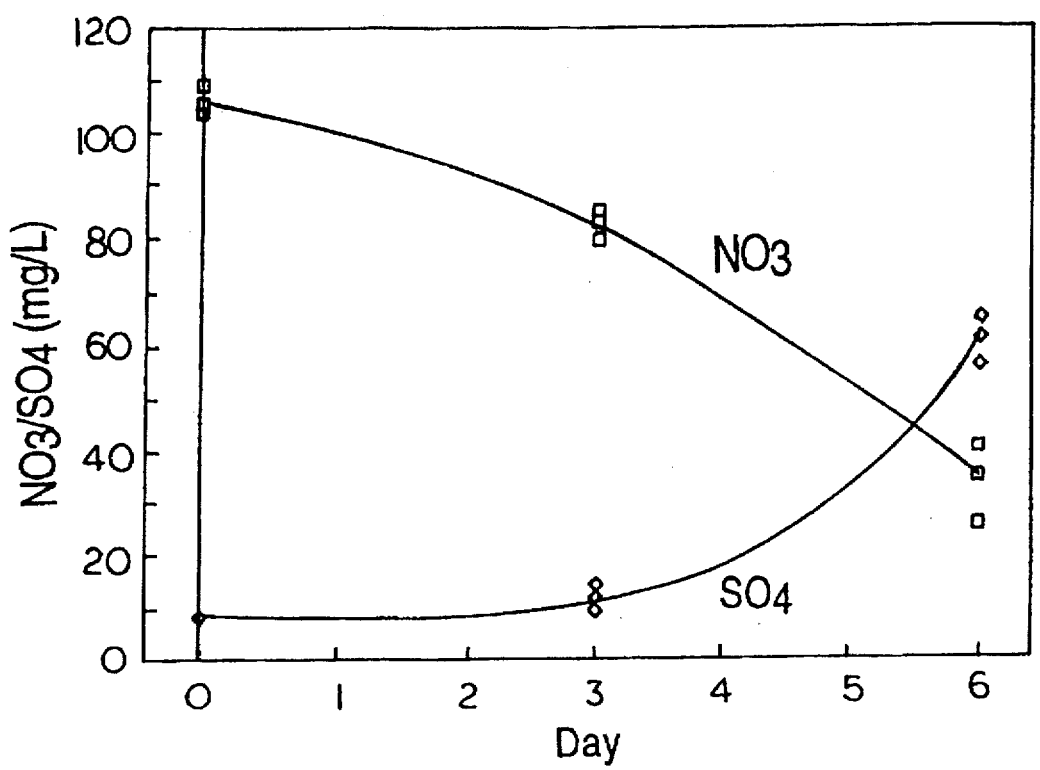
FIG. 20 illustrates data generated in denitrification experiments for bottle incubations.
Figure 21:
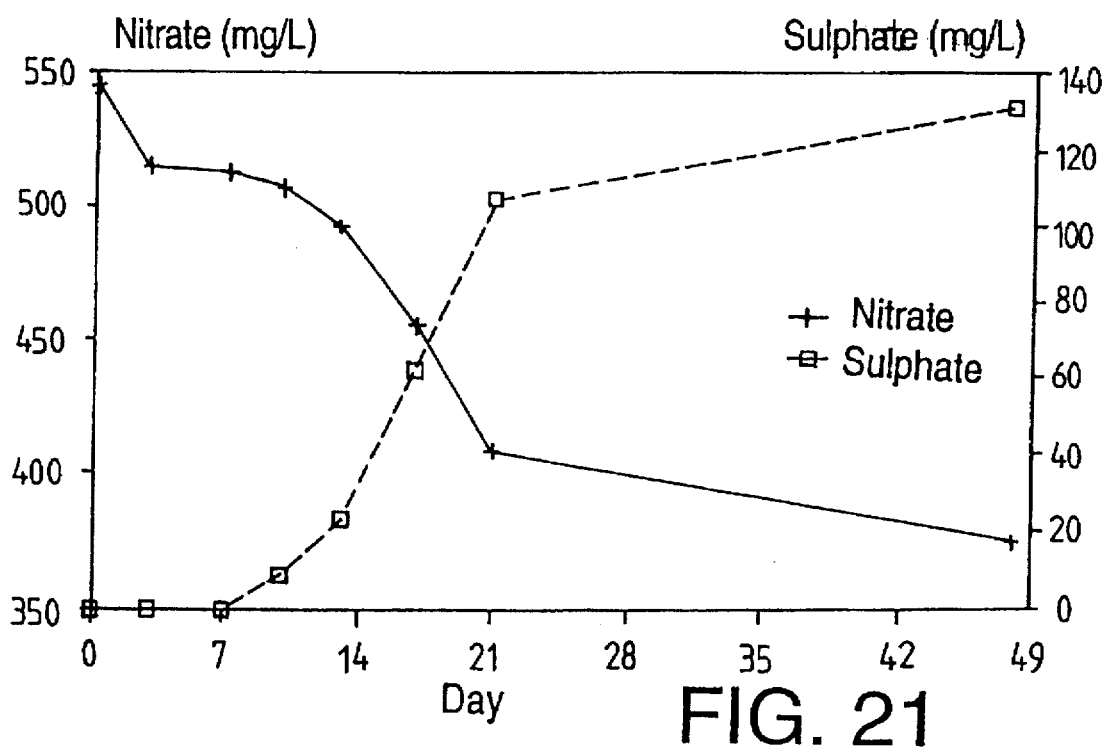
FIG. 21 illustrates data generated in denitrification experxments for 250 ml bottle incubations.

The initial laboratory reactor experiments have been successful in stimulating microbial metabolism in St. Marys River sediments with calcium nitrate. The microbial denitrification of nitrate was coupled to the rapid production of sulphate, this is illustrated in FIGS. 20 and 21. The production of sulphate reflects the microbial oxidation of organic sulphur, hydrogen sulphide, and perhaps elemental sulphur. The 100 mg/L N—$NO_3$ dose was completely denitrified (FIG. 20). The next experiment with 500 mg/L N—$NO_3$ resulted in incomplete denitrification of the added nitrate (FIG. 21). This sample was collected in late fall; the longer lag phase in the second experiment probably indicates that the microbes were inactive and needed more time to produce enzymes.

After two weeks of incubation, sediments treated with 500 mg/L N—$NO_3$ were given to Dr. Reynoldson (NWRI) for bioassays. They were toxic to Hexagenia. Based upon results from the second experiment (FIG. 22), these sediments had a high concentration of nitrate (>300 mg/L N—$NO_3$). Either the nitrate caused osmotic shock or the intense production of nitrogen gas disrupted their intestines. This experiment needs to be redone with less calcium nitrate. There would be no similar negative response in situ because no benthos would be living in sediments requiring treatment. However, this experiment does illustrate the need to balance the treatment dose to the biological oxygen demand of the sediments.

Figure 22:
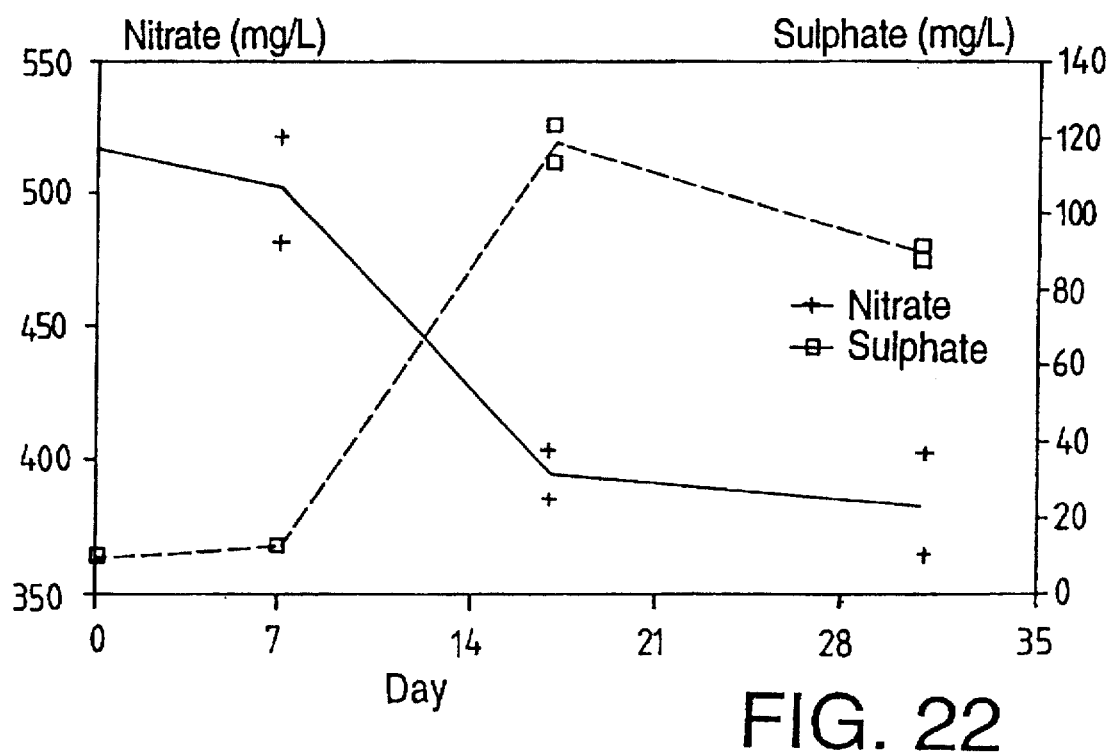
FIG. 22 illustrates data generated in denitrification experxments for 2 L bottle incubations.
Figure 23:
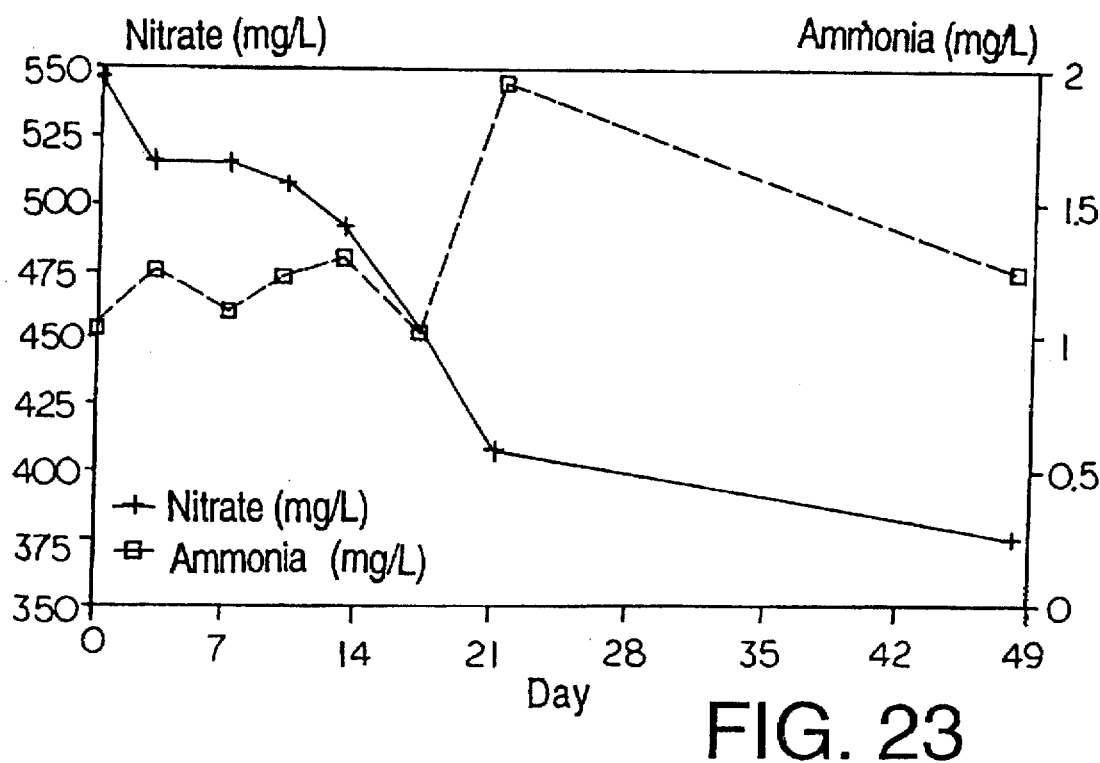
FIG. 23 illustrates data generated in denitrification experiments for 250 ml bottle incubations.
Figure 24:
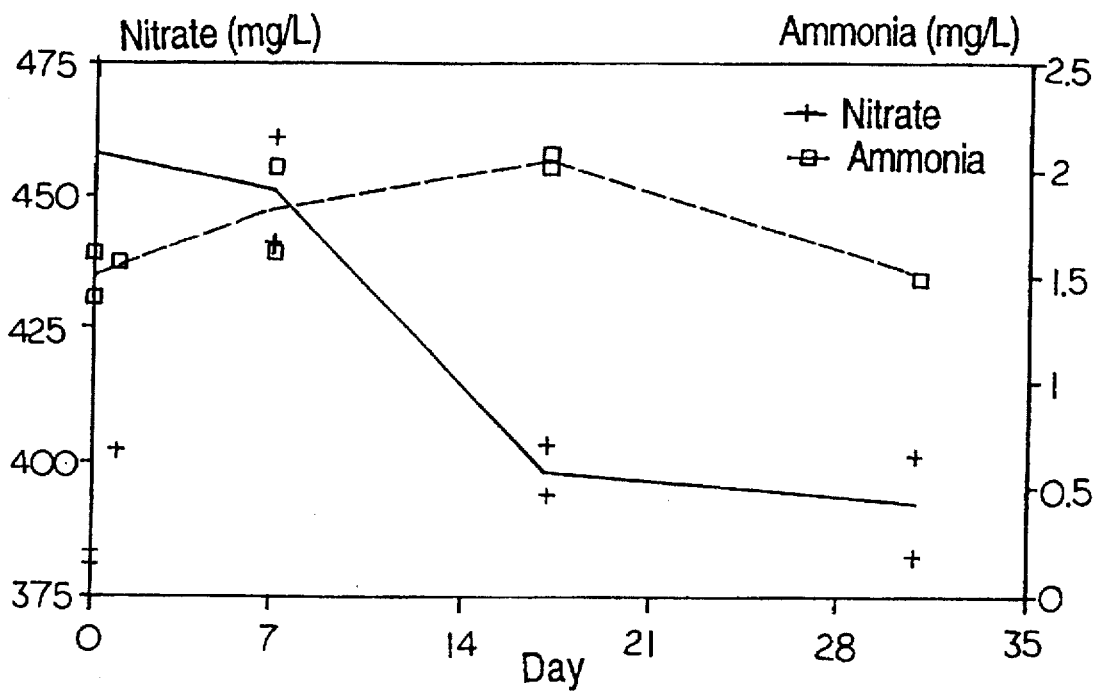
FIG. 24 illustrates data generated in denitrification experxments for 2 L bottle incubations.

In another trial using larger containers (2 L) without continuous shaking, the utilization of nitrate was slightly slower than in FIGS. 21 and 22). Since these incubations used 50% slurries, these incubations indicate that the optimal in situ does is about 350 mg/L N—$NO_3$. Very little ammonia was produced during these incubations (FIGS. 23–24). Other short-term trials indicated that phosphorus was not limiting microbial denitrification, that addition of iron did not suppress denitrification, and that the pH did not decrease significantly. For short-term incubations, nutrients did not appear to limit microbial metabolism and pH buffering was not required.

Figure 25:
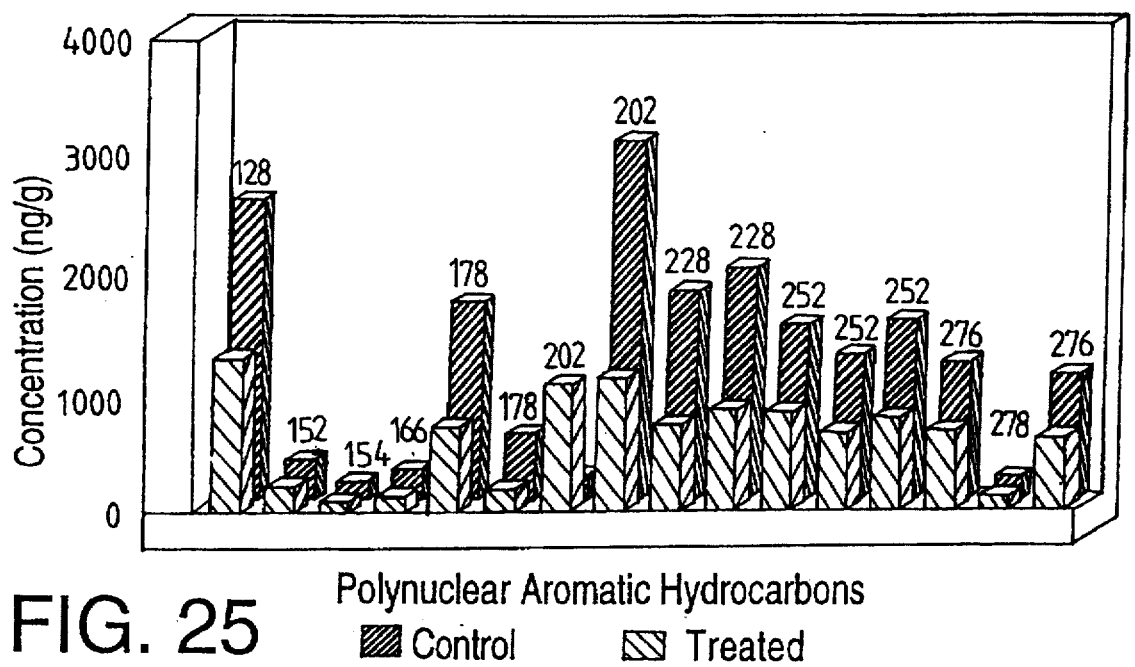
FIG. 25 illustrates the biodegradation of the sixteen priority pollutant polynuclear aromatic hydrocarbons.

In one year long incubations with sediments from the St. Marys River, nitrate treatment resulted in biodegradation of about 60% of the polynuclear aromatic hydrocarbons (PAHs, FIG. 25). The numbers in FIG. 25 refer to the molecular weight of the 16 priority pollutant polynuclear aromatic hydrocarbons. Note that the larger molecular weight compounds that can induce tumours are biodegraded as well as the smaller compounds. This observation is inconsistent with radioisotope studies done in our laboratory and in other laboratories. Smaller radiolabelled PAHs can biodegrade very quickly (within weeks). As observed in the Hamilton harbour studies, the conclusion is that very large PAHS that are too large to measure with available technology are biodegrading to produce measurable PAHs which continue to biodegrade. The rate limiting step on the treatment is the biodegradation of the large PAHs and the treated sites will require about two years for effective PAH treatment.

Hamilton Harbour

Figure 26:
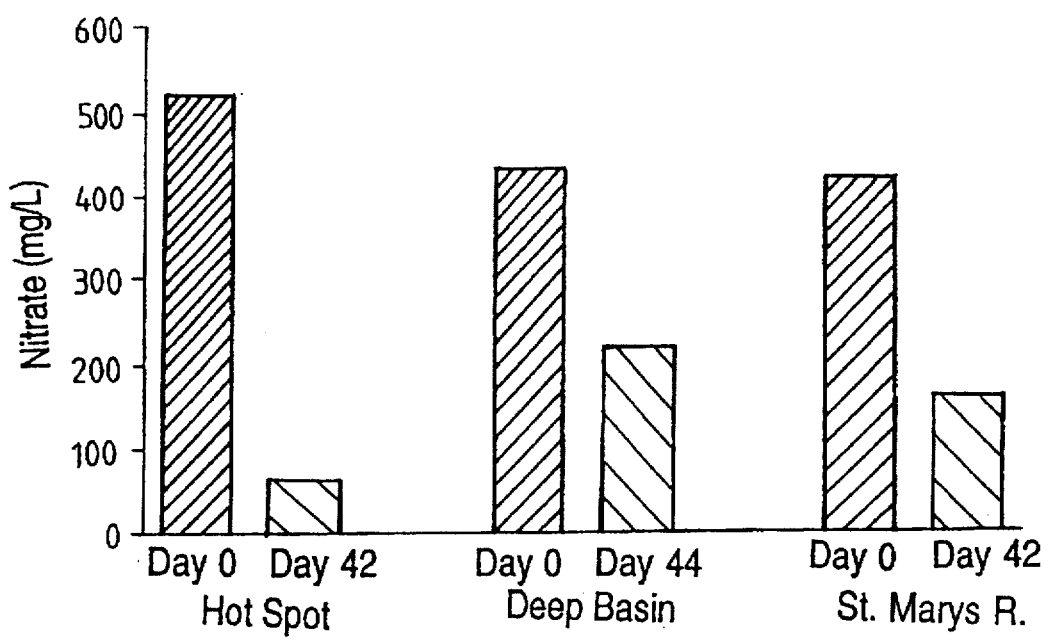
FIG. 26 illustrates the denitrification data comparing Hamilton Harbour Deep Basin, Stelco Hotspot and St. Marys River.
Figure 27:
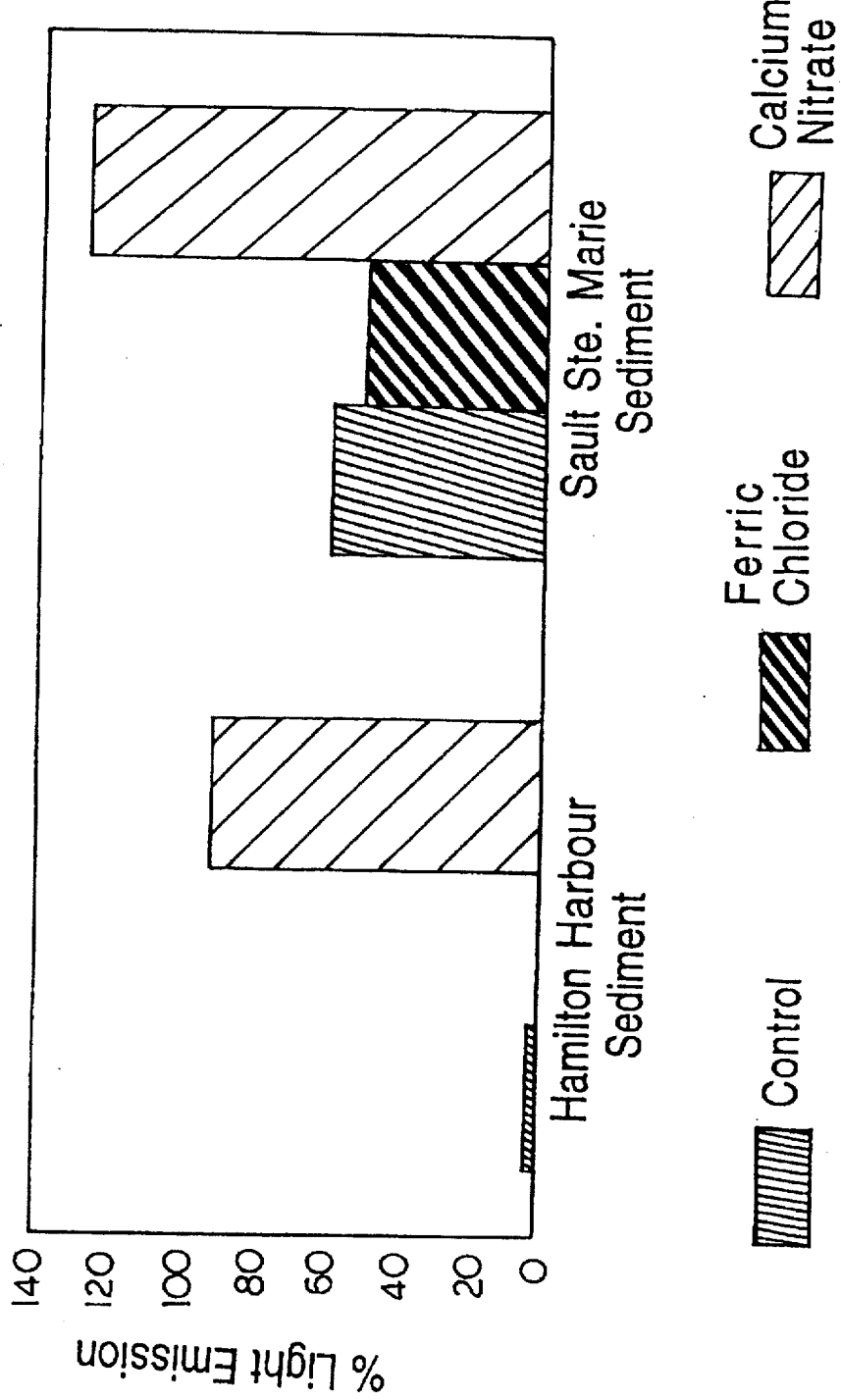
FIG. 27 illustrates the effect of the nitrate treatment on the Photobacterium.

The rate of denitrification in a sediment sample from the deep basin of Hamilton Harbour was slightly slower than in a sample from the St. Marys River (Bellevue site), and much slower than in a sample from the Stelco Hotspot (FIG. 26). In the sample from the deep basin of Hamilton Harbour, the denitrification resulted in the complete elimination of toxicity to Photobacterium (FIG. 27). The incubated sample from this Stelco Hotspot had residual hydrogen sulphide and toxicity persisted. More nitrate has been added to the Stelco Hotspot incubation and analysis will be replaced after a further six week incubation.

The oxidation of the deep basin sediments is more obvious than other sediments. These sediments were black at the start of the incubations, the control samples remained black, but the calcium nitrate treated samples turned brown. The sediments from the St. Marys River were not as black, but in long incubations (three months), the control samples turned black and the calcium nitrate samples stayed brown. The colour change reflects the change in the oxidation state of iron.

Another simple physical change also occurs during treatments. The control samples are very flocculant and these sediments stay in suspension for days. The treated sediments are not flocculant; these sediments precipitate within three hours after shaking. The treatments must polymerize negatively charged organic colloids. This flocculation could be very useful. Colloids can contain high concentrations of contaminants and their resuspension in dredging can create problems.

In general, the NWRI studies are consistent with published demonstrations of biodegradation but the processes are complex and this study is not complete. Simple analyses of "oil and grease" indicate about 50% biodegradation of the organic contamination. However, "total petroleum hydrocarbon" analysis indicate about 90% biodegradation of organic contamination. Some of the discrepancy is likely caused by the microbial conversion of organic contaminants into organic compounds in living cells.

Figure 28A:
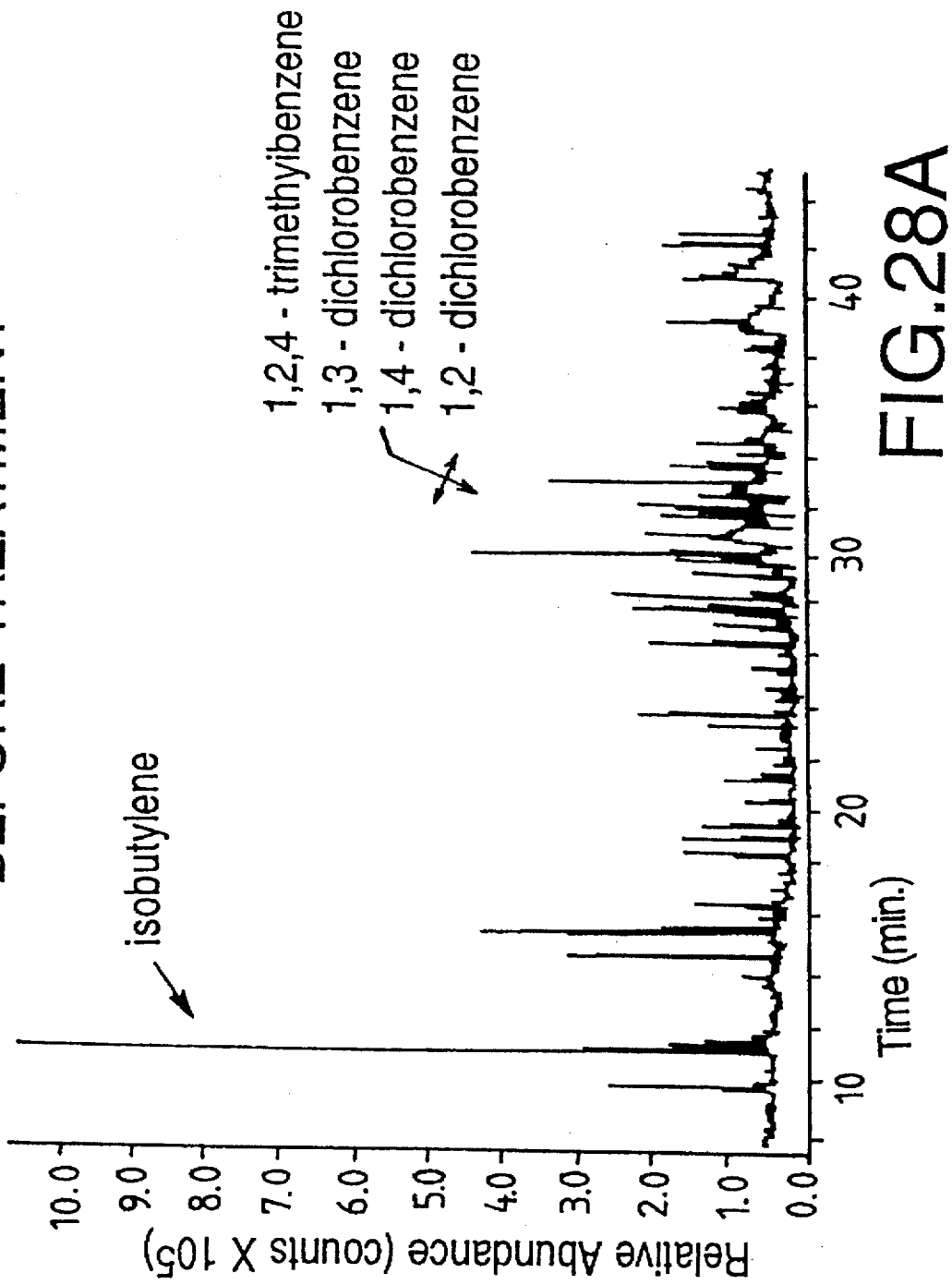
FIGS. 28A through 28B illustrate headspace GC/MS analysis for a variety of organic compounds for a control before treatment and for data gathered after nitrate treatment.
Figure 28B:
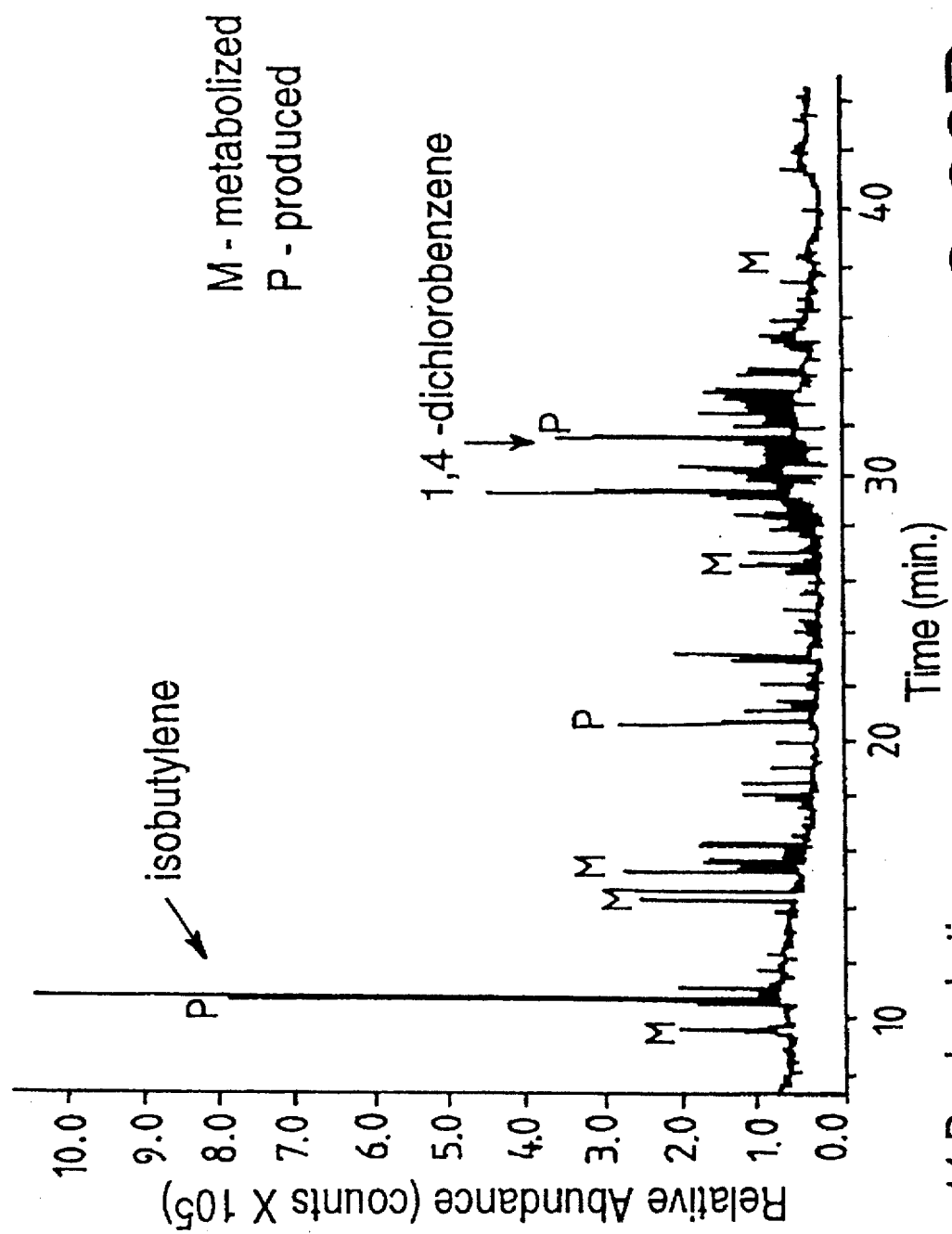

The PAH data from headspace analysis is complex but highly encouraging. Headspace analysis of some samples indicates biodegradation of butenes, chlorobenzenes, toluene, benzene, and naphthalene at rates consistent with other studies. Other analyses indicate production of several compounds, indicating cleavage of smaller molecular weight compounds from larger compounds. There are about 30 analyses as complex as FIGS. 28A through FIG. 28B. Further synthesis is required to resolve the complexities. Note that the analyses were replicated and the analytical error was insignificant.

The PAH analysis of the solids remaining after six weeks incubation with or without calcium nitrate indicated no significant biodegradation of naphthalene or other PAHs (Table 7). Analytically, the discrepancy with headspace analysis is possible in that the headspace represents only a small fraction of the total PAHs. The headspace is in equilibrium with free, unbound, bioavailable compounds, but the particulate PAH analysis is done on samples extracted vigorously with dichloromethane in a Soxhlet apparatus. There are two hypotheses that can resolve the PAH data sets. 1) Some small compounds were being cleaved from larger compounds at similar rates that microbes were biodegrading these smaller organic compounds. 2) Only a small fraction of the PAHs are biodegradable.

TABLE 7

PAHs in solids after chemical treatment

Hamilton Harbour and Sault Ste. Marie Biodegradation Study Fall 1991

| SEDIMENT ug/g | Hamilton Harbour control | Hamilton Harbour FeCl3 | Hamilton Harbour NO3 | Sault Ste. Marie control | Sault Ste. Marie FeCl3 | Sault Ste. Marie NO3 |
|---|---|---|---|---|---|---|
| NAPHTHALENE | 0.77 | 0.96 | 0.90 | 4.14 | 2.37 | 4.51 |
| ACENAPHTHYLENE | 0.19 | 0.27 | 0.23 | 0.26 | 0.18 | 0.23 |
| ACENAPHTHENE | 0.21 | 0.26 | 0.25 | 0.41 | 0.28 | 0.37 |
| FLUORENE | 0.50 | 0.67 | 0.52 | 0.64 | 0.45 | 0.56 |
| PHENANTHRENE | 3.36 | 4.59 | 4.24 | 4.45 | 3.09 | 4.00 |
| ANTHRACENE | 0.70 | 1.00 | 1.01 | 1.31 | 0.93 | 1.08 |
| FLUORANTHENE | 5.84 | 7.85 | 7.25 | 10.13 | 7.17 | 9.46 |
| PYRENE | 4.05 | 6.70 | 6.24 | 8.44 | 5.97 | 7.90 |
| BENZ[a]ANTHRACENE | 2.90 | 1.52 | 3.50 | 5.60 | 4.23 | 5.38 |
| CHRYSENE | 4.39 | 5.78 | 5.28 | 7.89 | 5.60 | 7.66 |
| BENZO[b]FLUORANTHENE | 4.92 | 6.05 | 2.77 | 6.38 | 3.76 | 6.68 |
| BENZO[k]FLUORANTHENE | 4.00 | 4.93 | 4.19 | 5.17 | 3.71 | 5.43 |
| BENZO[a]PYRENE | 1.00 | 5.60 | 7.43 | 7.02 | 6.45 | 7.30 |
| INDENO[1,2,3-cd]PYRENE | 3.31 | 1.85 | 0.22 | 2.44 | 0.74 | 3.13 |
| DIBENZ[a,h]ANTHRACENE | 1.38 | 1.25 | 0.17 | 1.04 | 0.14 | 1.55 |
| BENZO[g,h,i]PERYLENE | 3.23 | 2.15 | 0.96 | 2.64 | 0.88 | 3.22 |
| TOTAL | 40.75 | 51.43 | 45.16 | 67.94 | 45.95 | 68.47 |
| RETENE | 0.20 | 0.12 | 0.15 | 24.79 | 18.96 | 23.32 |

Figure 29:
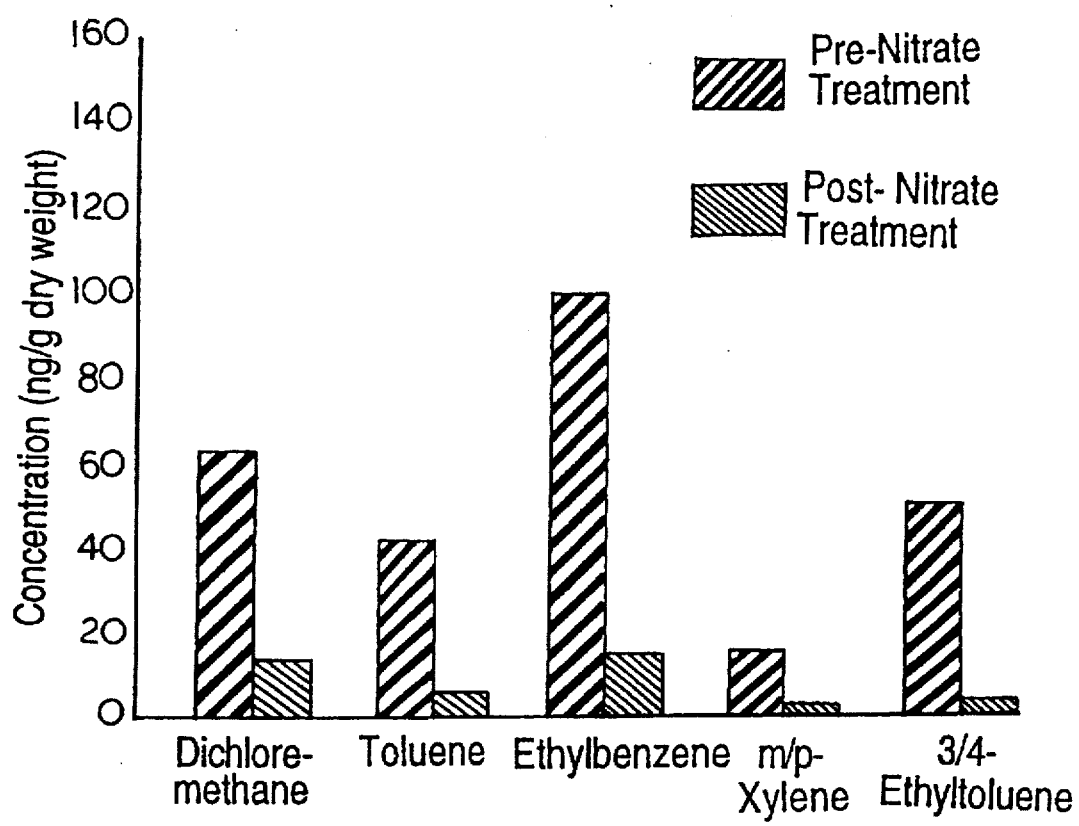
FIG. 29 illustrates the biodegradation of volatile toxins in the Dofasco boatslip before and after treatment.

Both hypotheses could be valid. Only a fraction of the total PAHs are analyzed in the routine 16 priority PAHs, no analytical techniques exist for very large molecular weight PAHs. Also for both sites there must be some PAHs locked in coal dust or other biologically inactive matrices. The interpretation would also vary between sites. For example, the proportion of PAHs in the aqueous phase in the St. Marys River incubations indicates enhanced production of naphthalene from larger compounds after the treatments (Table 8). In the aqueous phase of Hamilton Harbour incubations, the treatments appear to enhance biodegradation of naphthalene (Table 8). The uncertainties of PAH biodegradation have been resolved with longer incubations, and incubations with $^{14}$C-radioactively labelled naphthalene.

of the Dofasco Boatslip in 1992 resulted in the biodegradation of several organic compounds (mean of three samples, reductions as follows; toluene 80%, ethylbenzene 86%, m/p-xylene 76%, ¾-ethyltoluene 89%, and dichloromethane 65%) (FIG. 29). These relatively rapid biodegradation rates are similar to those reported in laboratory studies where nitrate was added to enhance biodegradation (Hutchins 1991).

Analysis of three samples indicates that 25% of the petroleum hydrocarbons were biodegraded in the Dofasco boatslip treatment.

The biodegradation of the PAHs (polynuclear aromatic hydrocarbons), in the Dofasco boatslip was more complex. About 15% (450 µg/g, to 383 µg/g mean of 3 samples) of 15

TABLE 8

PAHs in water after chemical treatments

Hamilton Harbour and Sault Ste. Marie Biodegradation Study Fall 1991

| SUPERNATANT ng/l | Hamilton Harbour control | Hamilton Harbour FeCl3 | Hamilton Harbour NO3 | Sault Ste. Marie control | Sault Ste. Marie FeCl3 | Sault Ste. Marie NO3 | Procedural blank |
|---|---|---|---|---|---|---|---|
| NAPHTHALENE | 410.70 | 205.29 | 43.20 | 178.65 | 2076.06 | 1963.06 | 0.04 |
| ACENAPHTHYLENE | 145.07 | 79.12 | 8.40 | 20.00 | 35.76 | 33.89 | nd |
| ACENAPHTHENE | 247.89 | 71.76 | nd | 252.16 | 210.61 | 305.28 | nd |
| FLUORENE | 301.13 | 155.29 | 28.00 | 178.11 | 274.55 | 256.39 | nd |
| PHENANTHRENE | 1415.49 | 659.71 | 344.40 | 616.22 | 814.30 | 848.31 | 0.03 |
| ANTHRACENE | 58.28 | 617.26 | nd | 52.43 | 52.91 | 76.11 | nd |
| FLUORANTHENE | 790.99 | 365.88 | 434.08 | 635.57 | 719.52 | 854.81 | 0.02 |
| PYRENE | 444.79 | 99.12 | 109.64 | 413.78 | 332.48 | 467.81 | 0.01 |
| BENZ[a]ANTHRACENE | 45.92 | 16.76 | 22.00 | 78.57 | 45.03 | 85.53 | 0.01 |
| CHRYSENE | 108.73 | 61.21 | 84.48 | 147.22 | 93.70 | 164.53 | 0.01 |
| BENZO[b]FLUORANTHENE | 113.49 | 69.68 | 56.56 | 88.54 | 87.97 | 141.50 | 0.02 |
| BENZO[k]FLUORANTHENE | 44.76 | 27.47 | 29.76 | 64.95 | 34.70 | 55.81 | 0.01 |
| BENZO[a]PYRENE | 70.14 | 48.53 | 19.72 | 17.30 | 69.42 | 55.28 | 0.01 |
| INDENO[1,2,3-cd]PYRENE | 44.25 | nd | 51.32 | nd | 36.52 | 11.81 | nd |
| DIBENZ[a,h]ANTHRACENE | 28.68 | nd | 7.40 | nd | 11.00 | nd | nd |
| BENZO[g,h,i]PERYLENE | 41.69 | nd | 22.00 | nd | 10.18 | 15.00 | nd |
| TOTAL | 4312.00 | 2477.09 | 1260.96 | 2743.49 | 4904.70 | 5335.08 | 0.16 |
| RETENE | 69.30 | nd | 0.92 | 582.43 | 267.27 | 85.64 | 0.13 |

Pilot-scale treatments also support the laboratory incubations. The addition of calcium nitrate to the sediments PAHs were biodegraded and in the process the naphthalene content increased 196% (280 µg/g to 549 µg/g, mean of 3 samples). The imbalance in the concentration of naphthalene suggests that other higher molecular weight compounds not measured in the standard priority pollutant PAH analysis are decomposing to produce naphthalene. Approximately 50% of the PAHs in coal tar pitch contain more than seven rings (Enzminger and Ablert 1987); we are capable of measuring less than 50% of the PAHs.

At first the ability of microbes to biodegrade organic wastes seemed less probable in Hamilton Harbour sediments than in sediments from the St. Marys River. Hamilton Harbour sediments have 10–100 times the concentration of metals. However, the rate of headspace naphthalene biodegradation is similar in sediments from Hamilton Harbour, St. Marys River, and samples from other sites (Heitkamp and Cerniglia 1987). Furthermore, the rates of denitrification in the St. Marys River sediments, Hamilton Harbour, and other sites in Germany (Ripl 1986) are similar. At these sites, metals do not appear to suppress microbial biodegradation. This is important in that many of the volatile organic compounds that were detected in the Hamilton Harbour Hotspot (Table 9) are biodegradable.

TABLE 9

STELCO HOTSPOT SEDIMENT
ANALYSIS BY PURGE AND TRAP GC/MS

| PARAMETER | (ng/ml) |
|---|---|
| 1,1-dichloroethylene | 659.2 |
| dichloromethane | 14.3 |
| trans-1,2-dichloroethylene | 11.3 |
| 1,1-dichloroethane | 97.2 |
| cis-1,2-dichloroethylene | 0.0 |
| chloroform | 13.0 |
| 1,1,1-trichloroethane | 0.0 |
| tetrachloromethane | 0.0 |
| 1,2-dichloroethane | 18.1 |
| benzene | 831.2 |
| trichloroethylene | 0.0 |
| 1,2-dichloropropane | 0.0 |
| dibromomethane | 0.0 |
| bromodichloromethane | 0.0 |
| toluene | 596.8 |
| 1,1,2-trichloroethane | 0.0 |
| tetrachloroethylene | 21.6 |
| chlorodibromomethane | 0.0 |
| 1,2-dibromoethane | 0.0 |
| chlorobenzene | 0.0 |
| ethylbenzene | 1348.8 |
| m/p-xylene | 3002.0 |
| o-xylene | 1225.2 |
| styrene | 274.3 |
| cumene (isopropylbenzene) | 119.3 |
| bromoform | 0.0 |
| 1,1,2,2-tetrachloroethane | 5.9 |
| propylbenzene | 112.9 |
| 1,3,5-trimethylbenzene | 150.8 |
| 1,2,4-trimethylbenzene | 14.1 |
| 3-ethyltoluene | 1050.0 |
| 4-ethyltoluene | 1247.2 |
| 2-ethyltoluene | 1598.0 |
| 1,3-dichlorobenzene | 10.3 |
| 1,4-dichlorobenzene | 0.0 |
| 1,2-dichlorobenzene | 0.0 |
| 1,4-diethylbenzene | 191.7 |
| 1,2-diethylbenzene | 9.3 |
| 1,3-diethylbenzene | 191.7 |
| naphthalene | 35920.0 |
| hydrogen sulphide | 100000.0 |

DISCUSSION

The oxidation of toxic hydrogen sulphide eliminates most of the acute toxicity from Hamilton Harbour and St. Marys River sediments (Murphy et al. 1992). The extreme anoxia reflected by high concentrations of hydrogen sulphide inhibits microbial biodegradation. In headspace analysis, some simple compounds like butene, naphthalene, and toluene appear to be biodegraded within weeks of nitrate addition. The biodegradation of larger non-volatile organic contaminants such as benzo(a)pyrene will be slower, albeit the published rates vary greatly. Heitkamp and Cerniglia (1987) found that naphthalene, pyrene and benzo(a)pyrene would degrade with half-lives 1.4–4.4 weeks, 38–90 weeks and 200–300 weeks, respectively. Shiaris (1989) found biodegradation turnover times of 13.2–20.1 days, 7.9–19.8 days, and 53.7–82.3 days for naphthalene, phenanthrene, and benzo(a)pyrene, respectively. Ongoing long-term bioassays in NWRI will help resolve the biodegradation of larger compounds like benzo(a)pyrene. The optimal study, however, would be the monitoring of pilot-scale applications of calcium nitrate to the sediments of as many sites as possible. Each site will be slightly different and new insights will develop from each treatment.

COMPARISON WITH FERRIC CHLORIDE TREATMENT

Because of the engineering success of the related experiments done by NWRI (Murphy et al. 1992), the calcium nitrate treatments have quickly become pilot-scale treatments. Both ferric chloride and calcium nitrate are oxidants. Ferric chloride is a weaker oxidant, albeit is reactions with metals and hydrogen sulphide are more direct and potentially useful. To achieve the equivalent oxidation potential of a 0.5% solution of calcium nitrate would require that the sediments become a 10% ferric chloride solution. This latter scenario would produce a toxic low pH that would require extensive buffering with lime. Moreover, calcium nitrate is less corrosive to equipment than ferric chloride. The chemical cost of treating the surface 15 cm of sediments with 500 mg/L N—$NO_3$ would cost $2,000 to $10,000 a hectare. The range of costs reflects the chemical oxygen. The sediments of the St. Marys River and deep basin of Hamilton Harbour require less than a third of the dose required for the Stelco Hotspot. With the 8 m injection boom and ideal conditions, about four hectares a day could be treated.

The sediments of the St. Marys River appear to be easy to treat. The acute toxicity is caused by hydrogen sulphide and it is readily oxidized by denitrification of added calcium nitrate (Murphy et al. 1992). The oxidized sediments produce no toxicity to *Daphnia magna, Hexagenia limbata, Escherichia coli,* or *Lactuca sativa*. Many chlorinated compounds often associated with pulpmill wastes were not detected (Table 10). Benzenes are detectable in these sediments and although they are carcinogens, they are biodegradable.

The concentration of PAHs is relatively low (Table 3; Murphy et al. 192, Table 1). The concentration of PAHs is approximately at the apparent effects threshold—the concentration where you begin to see toxic effects on the ecosystem (Long and Morgan 1990). There is no evidence that the PAHs in the sediments at the Bellevue site are a problem. Chemical data, particularly threshold concentrations, must be used cautiously. The high concentration of organic matter found in the sediments of the St. Marys River could reduce the bioavailability of PAHs as has been found at other sites (Landrum et al. 1987). As well as conducting additional chemical analyses, the endpoint of the biodegradation should be determined with bioassays. The best bioassay would be the response of the benthos in treated sediments.

TABLE 10

CHLORINATED PHENOLS IN ST. MARYS RIVER SEDIMENT CORE - JULY 8, 1991

| SAMPLE ID (CORE DEPTH - cm) | 0–1 | 6–7 | 12–14 | 14–16 | 16–18 | 22–24 |
|---|---|---|---|---|---|---|
| Chlorinated Phenols (ug/kg) Dry Weight | | | | | | |
| ortho-Chloro-phenol | * | * | * | * | * | * |
| meta-Chloro-phenol | * | * | * | * | * | * |
| para-Chloro-phenol | * | * | * | * | * | * |
| 2,6-Chloro-phenol | ND | ND | ND | ND | ND | ND |
| 2,4-Chloro-phenol | ND | ND | ND | ND | ND | ND |
| 3,5-Chloro-phenol | ND | ND | ND | ND | ND | ND |
| 2,3-Chloro-phenol | ND | ND | ND | ND | ND | ND |
| 3,4-Chloro-phenol | ND | ND | ND | ND | ND | ND |
| 2,4,6-Chloro-phenol | ND | ND | ND | ND | ND | ND |
| 2,3,6-Chloro-phenol | ND | ND | ND | ND | ND | ND |
| 2,3,5-Chloro-phenol | ND | ND | ND | ND | ND | ND |
| 2,4,5-Chloro-phenol | ND | ND | ND | ND | ND | ND |
| 3,4,5-Chloro-phenol | ND | ND | ND | ND | ND | ND |
| 2,3,5,6-Chloro-phenol | ND | ND | ND | ND | ND | ND |
| 2,3,4,5-Chloro-phenol | ND | ND | ND | ND | ND | ND |
| Penta-Chloro-phenol | ND | ND | ND | ND | ND | ND |
| 4-Chloro-guaiacol | * | * | * | * | * | * |
| 4,6-Chloro-guaiacol | ND | ND | ND | ND | ND | ND |
| 4,5-Chloro-guaiacol | ND | ND | ND | ND | ND | ND |
| 3,4,5-Chloro-guaiacol | ND | ND | ND | ND | ND | ND |
| 4,5,6-Chloro-guaiacol | ND | ND | ND | ND | ND | ND |
| 3,4,5,6-Chloro-guaiacol | ND | ND | ND | ND | ND | ND |
| 4-Chloro-catechol | * | * | * | * | * | * |
| 3,5-Chloro-catechol** | ND | ND | ND | ND | ND | ND |
| 2,3,4,6-Chlorophenol** | | | | | | |
| 4,5-Chloro-catechol | ND | ND | ND | ND | ND | ND |
| 3,4,5-Chloro-catechol | ND | ND | ND | ND | ND | ND |
| 3,4,5,6-Chloro-catechol | ND | ND | ND | ND | ND | ND |
| 6-Chloro-vanillin | NA | NA | NA | NA | NA | NA |
| 5,6-Chloro-vanillin | ND | ND | ND | ND | ND | ND |
| Tri-chloro-syringol | ND | ND | ND | ND | ND | ND |
| 4,5 Di-chloro-veratrole | ND | ND | ND | ND | ND | ND |
| 3,4,5 Tri-chloro-veratrole | ND | ND | ND | ND | ND | ND |
| Tetra-chloro-veratrole | ND | ND | ND | ND | ND | ND |
| GUGICOL | * | * | * | * | * | * |
| CATECOL | * | * | * | * | * | * |

*analysis for these compounds to follow
**these compounds coelute
ND not detected
NA not applicable

I claim:

1. A method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegradation, comprising the steps of:

providing a biochemical oxidant selected from the group comprising ferric chloride and calcium nitrate for detoxifying a microbial toxin produced during microbial biodegradation of said polynuclear aromatic hydrocarbons and petroleum hydrocarbons without inactivating the microbes;

contacting said sediment with said oxidant to detoxify said toxin; and effecting enhanced microbial biodegradation of said polynuclear aromatic hydrocarbons and petroleum hydrocarbons.

2. The method as defined in claim 1, wherein the contacting step is a reaction step.

3. The method as defined in claim 1, wherein said oxidant comprises calcium nitrate.

4. A method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegradation, wherein the method comprises the steps of:

providing a biochemical oxidant selected from the group comprising ferric chloride and calcium nitrate for detoxifying a microbial toxin produced during microbial biodegradation of said polynuclear aromatic hydrocarbons and petroleum hydrocarbons without inactivating the microbes;

providing a nutrifying organic amendment for nutrifying microbes;

injecting said sediment with said amendment and oxidant to detoxify said toxin with minimal disruption of said sediment while nutrifying said microbes; and effecting enhanced microbial biodegradation of said polynuclear aromatic hydrocarbons and petroleum hydrocarbons.

5. The method as defined in claim 4, wherein the contacting step is a reaction step.

6. The method as defined in claim 4, wherein the step of contacting said sediment with said oxidant to detoxify said toxin includes contacting said sediment in a first contacting step with said oxidant at a first level therein.

7. The method as defined in claim 6, wherein said step further includes the step of contacting said sediment in a second contacting step with said oxidant at least at a second level in said sediment, said second level being different from said first level and effecting said natural microbial biodegradation of said polynuclear aromatic hydrocarbons and petroleum hydrocarbons.

8. The method as defined in claim 7, wherein said oxidant comprises calcium nitrate.

9. The method as defined in claim 7, wherein said method is a continuous method.

10. A method of effecting compaction of sediment containing microbes, polynuclear aromatic hydrocarbons and petroleum hydrocarbons and microbial toxin inhibiting biodegradation, wherein the method comprises the steps of:

providing a biochemical oxidant selected from the group comprising ferric chloride and calcium nitrate for detoxifying a microbial toxin produced during microbial degradation of said polynuclear aromatic hydrocarbons and petroleum hydrocarbons without inactivating the microbes;

providing a fermentation by-product organic amendment;

injecting said sediment with said oxidant and said by-product organic amendment with minimal disruption of said sediment;

effecting enhanced microbial degradation of said polynuclear aromatic hydrocarbons and petroleum hydrocarbons; and compacting said sediment by evolution of gaseous by-products evolved from contact of said oxidant and amendment with said sediment.

11. The method as defined in claim 10, wherein said fermentation by-product amendment comprises a fungal organic amendment.

12. The method as defined in claim 10, wherein contact of said sediment with said oxidant is an oxidation step.

13. The method as defined in claim 10, wherein said oxidant comprises calcium nitrate.

14. The method as defined in claim 13, wherein said fungal organic amendment comprises yeast.

15. The method as defined in claim 14, wherein said yeast is a viable yeast culture.

16. The method as defined in claim 14, wherein said yeast is a non-viable yeast culture.

17. The method as defined in claim 14, wherein said yeast comprises brewer's yeast.

18. The method as defined in claim 17, wherein said yeast has a moisture content.

19. A method of effecting natural microbial biodegradation of polynuclear aromatic hydrocarbons and petroleum hydrocarbons in sediment containing microbes and polynuclear aromatic hydrocarbons and petroleum hydrocarbons and microbial toxin inhibiting biodegradation, wherein the method comprises the steps of:

providing a biochemical oxidant selected from the group comprising ferric chloride and calcium nitrate for detoxifying a microbial toxin produced during microbial biodegradation of said polynuclear aromatic hydrocarbon and petroleum hydrocarbons without inactivating the microbes;

providing a fermentation byproduct organic amendment;

injecting within said sediment at, at least, one level with said oxidant and said organic amendment; and effecting enhanced microbial degradation of said polynuclear aromatic hydrocarbons and petroleum hydrocarbons.

20. The method as defined in claim 19, wherein said organic amendment comprises a fungal organic amendment.

21. The method as defined in claim 20, wherein said fungal organic amendment comprises yeast.

22. The method as defined in claim 21, wherein said yeast is a viable yeast culture.

* * * * *